US005776292A

United States Patent [19]

Fujii et al.

[11] Patent Number: 5,776,292

[45] Date of Patent: Jul. 7, 1998

[54] PLYWOOD LAY-UP SYSTEM

[75] Inventors: Yutaka Fujii, Fukuyama; Fuminori Akao, Fuchu, both of Japan; John Omelchuk, Armstrong, Canada

[73] Assignee: Kitagawa Seiki Kabushiki Kaisha, Hiroshima-ken, Japan

[21] Appl. No.: 852,662

[22] Filed: May 7, 1997

Related U.S. Application Data

[62] Division of Ser. No. 394,710, Feb. 27, 1995, Pat. No. 5,665,197.

[51] Int. Cl.[6] .......... B32B 31/00

[52] U.S. Cl. .......... 156/299; 156/313; 156/563

[58] Field of Search .......... 156/297, 299, 156/300, 264, 313, 556, 557, 558, 560, 563, 559; 118/262; 414/788.5, 793.9, 793, 904

[56] References Cited

U.S. PATENT DOCUMENTS

| | | | |
|---|---|---|---|
| 3,580,778 | 5/1971 | Larson | 156/299 |
| 3,598,252 | 8/1971 | Billett | 414/789.6 |
| 3,616,090 | 10/1971 | Larson | 156/559 |
| 3,620,887 | 11/1971 | Nelson | 156/563 |
| 3,723,227 | 3/1973 | Oono et al. | 156/557 |
| 3,725,183 | 4/1973 | Brookhyser et al. | 156/563 |
| 3,730,816 | 5/1973 | Crawford | 156/559 |
| 3,795,560 | 3/1974 | Matsumoto et al. | 156/300 |
| 4,144,112 | 3/1979 | Hasegawa | 156/313 |
| 4,189,271 | 2/1980 | Hasegawa | 414/35 |
| 4,316,758 | 2/1982 | Suzuki et al. | 156/351 |
| 4,342,615 | 8/1982 | Koch, II | 156/563 |
| 4,797,169 | 1/1989 | Aizawa et al. | 156/64 |

*Primary Examiner*—James Engel
*Attorney, Agent, or Firm*—Kane, Dalsimer,Sullivan, Kurucz, Levy, Eisele and Richard, LLP

[57] ABSTRACT

A plywood layup system for assembling veneer plies includes a carousel feeder that supplies core veneer plies to an accumulator gate system. The accumulator gate system accumulates one or several plies into a predetermined ply assembly pattern before releasing the accumulated plies. A glue application system is controlled to apply glue to either or both sides of a core veneer ply to allow many different assemblies to be made. The accumulated plies can be dropped aligned with and synchronized with a ply or assembly of plies, to form a complex assembly. The accumulator gate system can be arranged above a conveyor carrying passing plies or partial assemblies from other veneer supplying devices. Two carousels and accumulator gate systems can be arranged in tandem to provide more complex patterns of assembly. Long grain veneer plies can be interspersed with the core veneer plies while on the accumulator gate system, and the carousel holds the approaching core veneer plies at angles that allow the insertion to be performed easily.

4 Claims, 15 Drawing Sheets

PLYWOOD LAY-UP SYSTEM

This is a division of application Ser. No. 08/394,710, filed Feb. 27, 1995, now U.S. Pat. No. 5,665,197.

BACKGROUND OF THE INVENTION

The present invention relates to plywood lay-up technology, and more specifically, to conveyor-type lay-up systems capable of laying-up a range of plywood products.

Conventionally, plywood lay-up may be accomplished by a conveyor lay-up line or at a stationary assembly station. Plies of face and center long grain veneer are laid with intervening plies of cross grain fragments or one-piece core, and glue is applied at some stage of the process between plies. The glue is cured under heat and pressure, to produce standard plywood sheets having substantially equalized strength in both grain directions.

On a conveyor type lay-up line, each step is conventionally carried out in line sequence along the lay-up line, and one ply at a time is placed on the conveyor. For example, for a typical 5-ply sheet, a long grain back ply, a crossband core, a long grain center ply, a second crossband core, and a long grain face ply are stacked in order. The crossband cores may be arranged random core, or one-piece spliced core. Adhesive may be applied by spray or curtain coat to one side of long grain plies or cores as they are laid, or may alternatively be applied by roller to both sides of a core ply as it is laid. Typically, each ply is provided to a conveyor by an auxiliary feeder, able to supply the main lay-up line at a rate matching the lay-up line feed rate. Each ply in the stacking order requires a dedicated feeder, and each dedicated feeder is placed along the lay-up line in the order that the ply is stacked in the final laminated sheet.

Given that each conventional face or center feeding machine and each crossband core feeding machine occupies a space adjacent to the conveyor in a certain order, and that each machine has only alternatives of laying a ply or doing nothing, then a conventional conveyor-type line has very little flexibility in product range. The lack of flexibility in products is a serious shortcoming of the conventional conveyor-type lay-up line.

Conventionally, to augment the range of possible products to be made by a typical lay-up line, specific assemblies of plywood lay-up must be determined, then the required individual machines added for each assembly. Each machine serves a single function, and the line becomes extremely long. Thus, using conventional lay-up techniques, a flexible lay-up line becomes very long, and is therefore extremely difficult to establish in an existing facility.

However, the linear movement of stacked plies along a lay-up line is a conventional and well understood process. To radically change the processing technique introduces new control, transportation, post-processing, and training issues. It is difficult to integrate a device having improved flexibility to the line.

SUMMARY OF THE INVENTION

It is therefore an object of the present invention to provide an improved plywood lay-up system, having superior production flexibility and output, thus enabling the system to produce a wide range of plywood products, or to produce standard products very quickly. It is another object of the present invention to provide a lay-up station for a lay-up assembly operation that can lay one ply or a plurality of plies at a single station. It is a further object of the present invention to integrate the improved lay-up system into an existing conveyor-type lay-up line, thus improving the flexibility of the conveyor lay-up line while maintaining the general operating characteristics of conveyor--type lay-up. It is a still further object of the present invention to provide a carousel sheet feeder for a lay-up system that allows the insertion of plies interspersed with plies fed by the carousel.

According to one aspect of the present invention, a plywood lay-up system, comprises means for accumulating veneer plies, the accumulating means being able to accept transferred veneer plies and to accumulate a plurality of veneer plies into a ply assembly, and subsequently to release the ply assembly; means for supplying unitary core veneer plies; and a rotary carousel, comprising a rotor, the rotor having means for clamping arranged about a periphery of the rotor, the rotary carousel being able to transfer unitary core veneer plies from the supplying means to the accumulating means by clamping an edge of a unitary core veneer ply supplied by the supplying means in the clamps, rotating the rotor and bearing the unitary core veneer ply to the accumulating means, then releasing the clamping of the unitary core veneer ply at the accumulating means. Alternatively, the system further comprises a conveyor, positioned proximate to the accumulating means, the conveyor being able to accept released ply assemblies from the accumulating means and able to convey the ply assemblies, wherein the rotary carousel has an axis of rotation parallel to a conveying path of the conveyor. Preferably, the system further comprises means for supplying long grain veneer plies to be fed to the accumulating means. Further preferably, the means for supplying core veneer plies comprises a glue application means for applying glue to the unitary core veneer plies. Still further preferably, the glue application means comprises a mechanism for controlling glue applied to each face of the unitary core veneer plies, selectively setting the amount of glue applied. Yet still further preferably, the clamping means comprises a plurality of sets of clamps provided to the carousel, each set of clamps arranged in a line parallel to a rotating axis of the rotor, and evenly distributed about the periphery of the rotor. Also, preferably, the accumulating means comprises at least one rotary drop apparatus for catching the unitary core veneer plies released by the carousel and for holding the ply assembly, where the rotary drop apparatus comprises a plurality of escapement arms mounted to a common shaft. Further preferably, the lay-up system further comprises at least one sensor, and the accumulating means is controlled to release the ply assembly on top of the stack of plies in response to sensing by the sensor.

According to another aspect of the present invention, a plywood lay-up system comprises means for assembling veneer plies; means for supplying unitary core veneer plies; a rotary carousel, comprising a rotor, the rotor having means for clamping arranged about a periphery of the rotor, the rotary carousel being able to transfer unitary core veneer plies from the supplying means to the assembling means by clamping an edge of a unitary core veneer ply supplied by the supplying means in the clamps, rotating the rotor and bearing the unitary core veneer ply to the assembling means, then releasing the clamping of the unitary core veneer ply at the assembling means; and control means for controlling the rotary carousel to transfer unitary core veneer plies from the supplying means to the assembling means according to a selected pattern of ply assembly. Preferably, the means for assembling comprises: means for accumulating veneer plies, the accumulating means being able to accept transferred veneer plies and to accumulate a plurality of veneer plies into a ply assembly, and subsequently to release the ply assembly, wherein the rotary carousel is capable of releasing each of the unitary core veneer plies to the accumulating means.

According to still another aspect of the present invention, a plywood lay-up system, comprises a conveyor, able to convey ply assemblies; first means for accumulating veneer plies, the first accumulating means being able to accept transferred veneer plies and to accumulate a plurality of veneer plies into a first ply assembly, and subsequently to release the first ply assembly to the conveyor; first means for supplying unitary core veneer plies; and a first rotary carousel, comprising a rotor, the rotor having means for clamping arranged about a periphery of the rotor, the first rotary carousel being able to transfer unitary core veneer plies from the first supplying means to the first accumulating means by clamping an edge of a unitary core veneer ply supplied by the first supplying means in the clamps, rotating the rotor and bearing the unitary core veneer ply to the first accumulating means, then releasing the clamping of the unitary core veneer ply at the first accumulating means. second means for accumulating veneer plies, the second accumulating means being able to accept transferred veneer plies and to accumulate a plurality of veneer plies into a second ply assembly, and subsequently to release the second ply assembly to the conveyor; second means for supplying unitary core veneer plies; and a second rotary carousel, comprising a rotor, the rotor having means for clamping arranged about a periphery of the rotor, the second rotary carousel being able to transfer unitary core veneer plies from the second supplying means to the second accumulating means by clamping an edge of a unitary core veneer ply supplied by the second supplying means in the clamps, rotating the rotor and bearing the unitary core veneer ply to the second accumulating means, then releasing the clamping of the unitary core veneer ply at the second accumulating means wherein each of the first and second accumulating means is able to release the corresponding ply assembly to the conveyor on top of a stack of plies conveyed by the conveyor 35. The plywood lay-up system according to claim 34, further comprising means for providing long grain veneer plies, arranged upstream and downstream, along a conveying path of the conveyor, of each of the first and second accumulating means, wherein each of the means of providing long grain veneer plies is able to provide a long grain veneer ply on top of a stack of plies conveyed by the conveyor.

According to yet another aspect of the present invention, a lay-up method for assembling plywood veneer plies comprises the steps of: (a) providing a long grain back veneer ply to a conveyor to be conveyed beneath an accumulating means; then (b) gluing a unitary crossband core veneer ply; then (c) providing the glued unitary crossband core veneer ply to the accumulating means; then (d) holding the glued unitary crossband core veneer ply in the accumulating means while the long grain back veneer ply approaches; then (e) releasing any plies held in the accumulating means on top of the long grain back veneer plies in synchronization with the approach of the long grain back veneer plies and aligned with the long grain back veneer plies to form a ply assembly.

According to yet still another aspect of the present invention, a rotary carousel layup station for plywood layup comprises a rotor; a plurality of sets of clamps arranged about a periphery of the rotor for transferring unitary core veneer plies, each set of the sets of clamps comprising a plurality of clamps arranged in a line parallel to a rotating axis of the rotor, and each of the sets of the clamps being rotatable relative to the rotor, wherein a relative angle between each of the sets of the clamps and the rotor is defined as an obtuse angle between a) a direction of extension of a core veneer ply held in the set of the clamps and b) an imaginary line between an axis of rotation of the rotor and the axis of rotation of the set of the clamps, and wherein the rotary carousel is able to transfer unitary core veneer plies by clamping an edge of a unitary core veneer ply, rotating the rotor and transferring the unitary core veneer ply, then releasing the clamping of the unitary core veneer ply; and an angle control system for controlling the relative angles between each of the sets of the clamps and the rotor, the angle control system being able to control the relative angles between the sets of the clamps and the rotor such that along the rotation of the rotor, after the clamping of the unitary core veneer ply and before the releasing of the unitary core veneer ply, each the relative angle increases for a first portion of the rotation, then decreases for a subsequent second portion of the rotation, and then increases for a subsequent third portion of the rotation.

DESCRIPTION OF THE ACCOMPANYING DRAWINGS

Figure 6A:
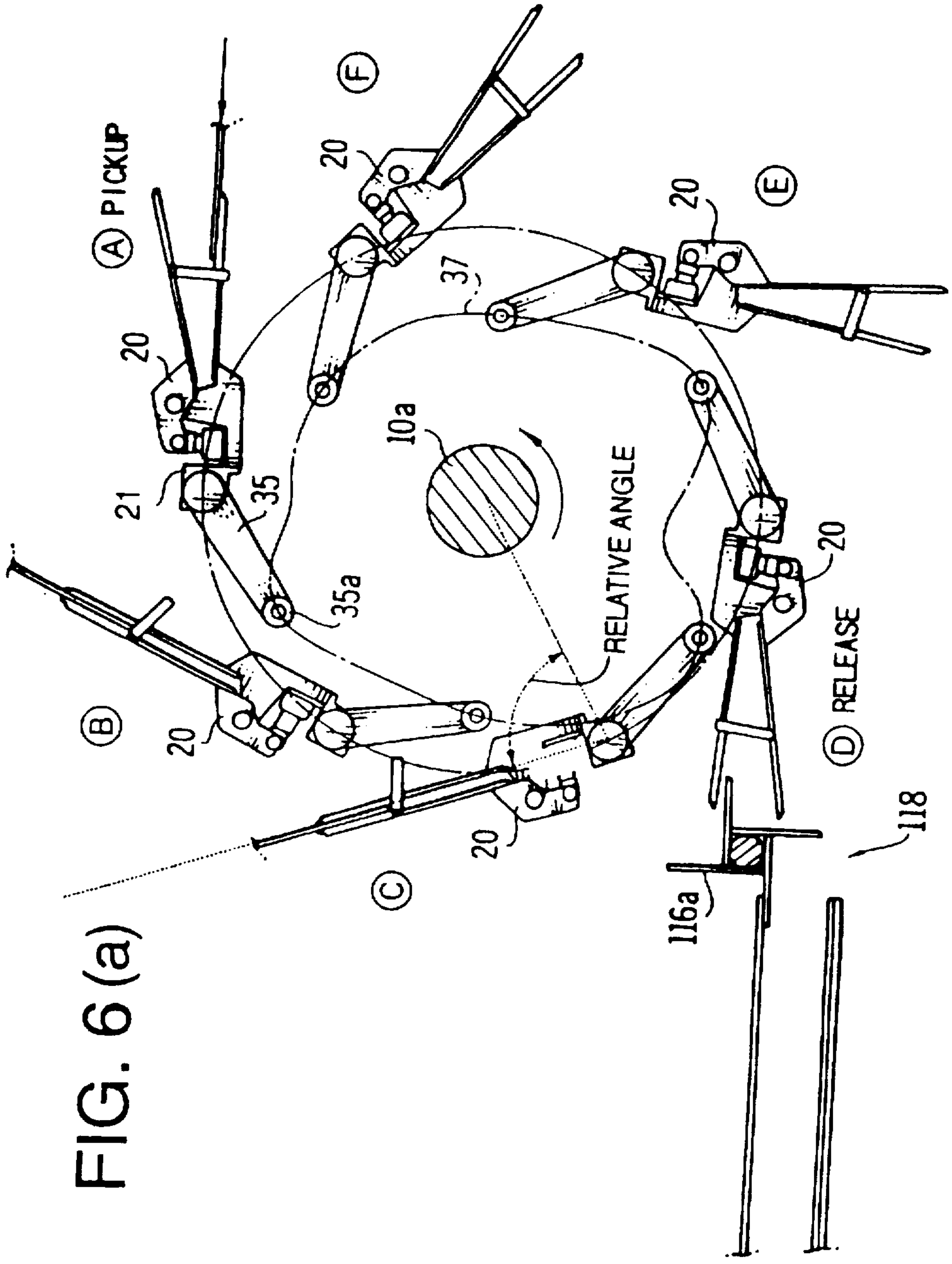
Figure 6B:
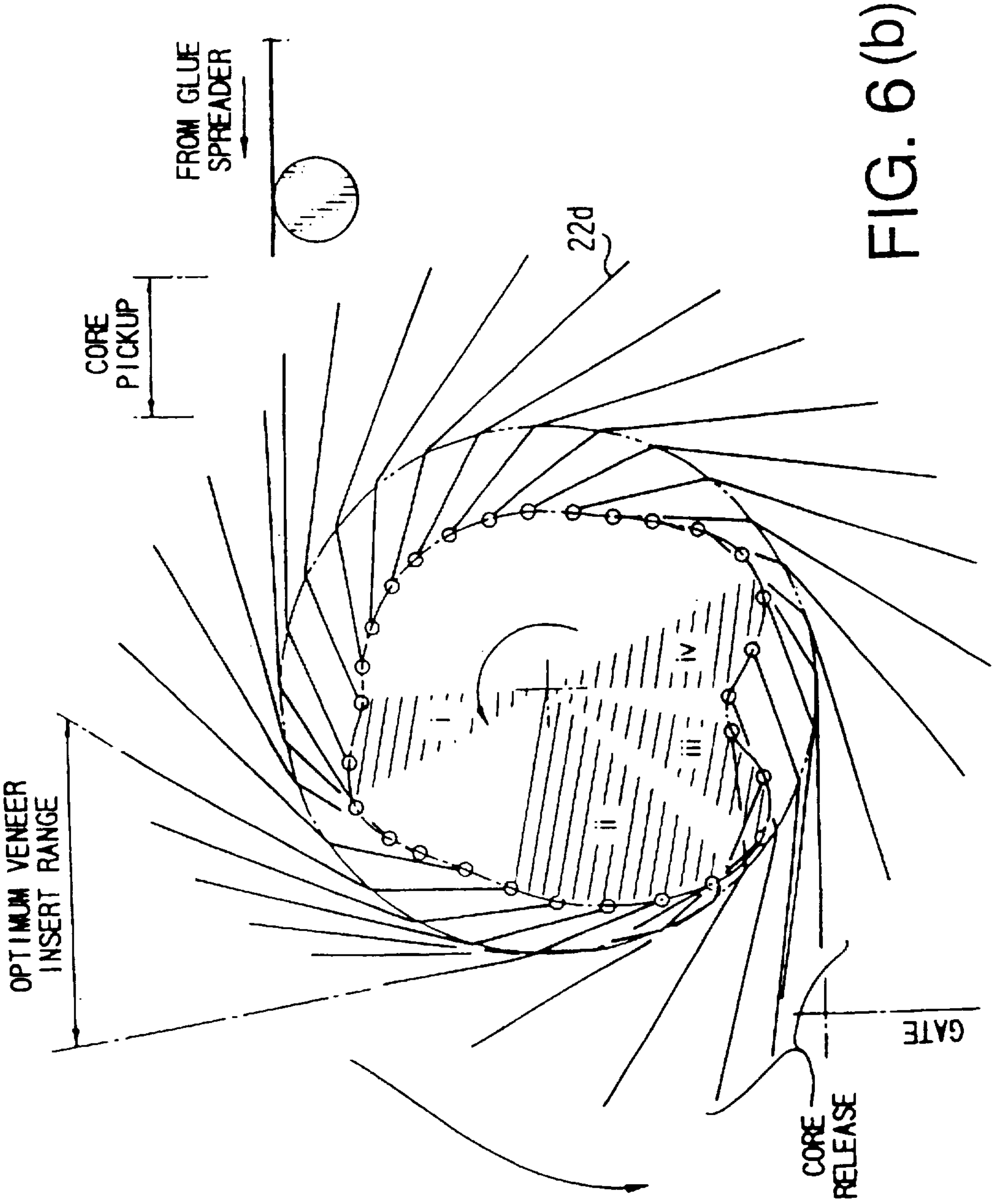
Figure 7:
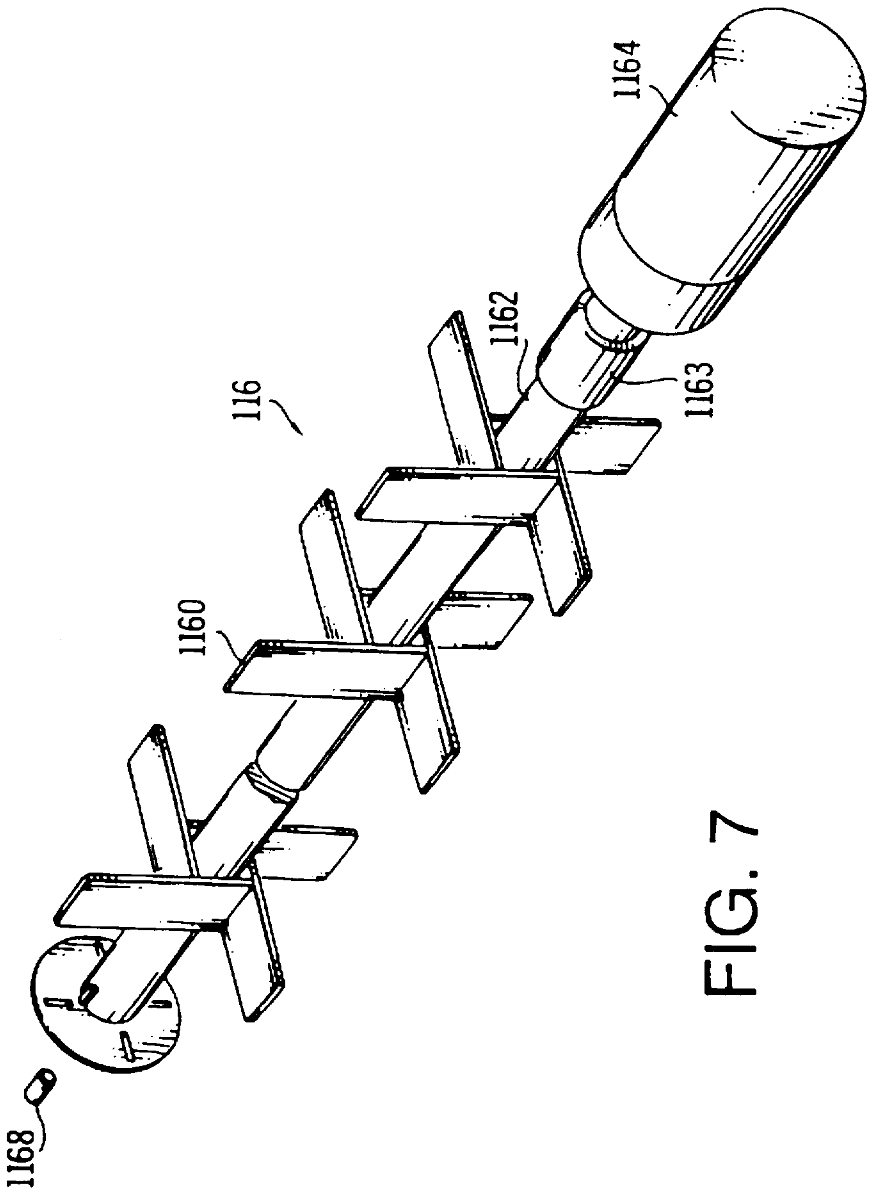
Figure 8:
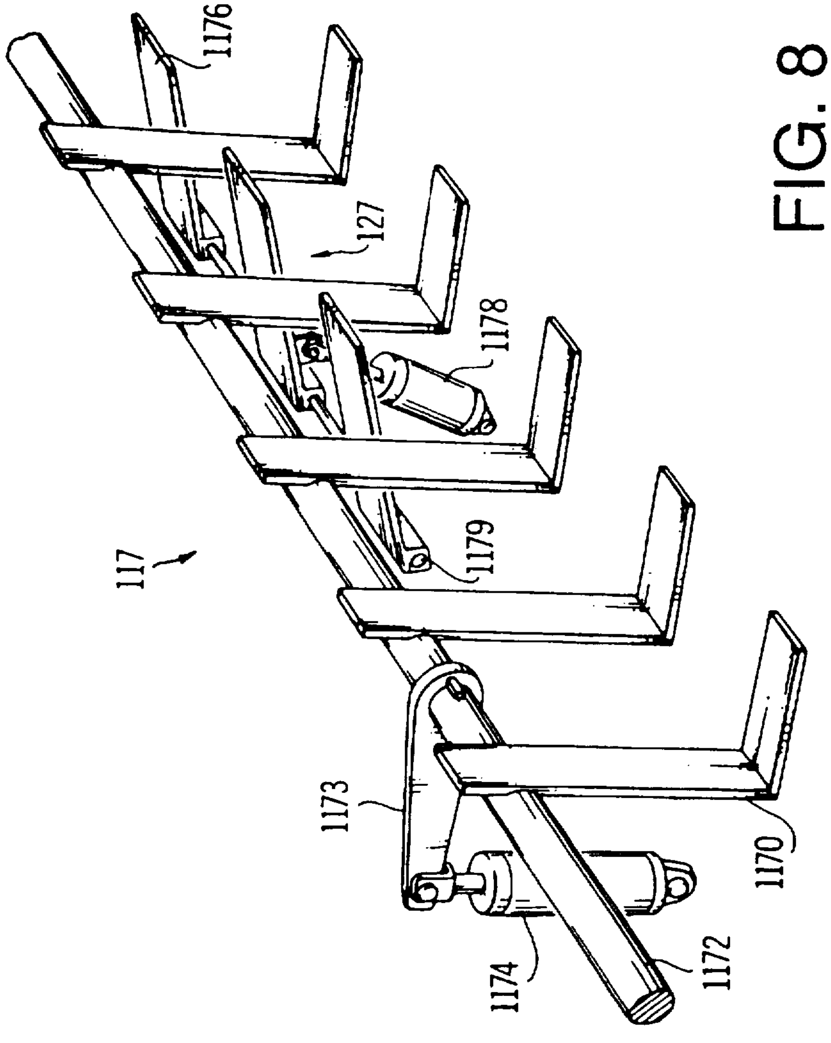
Figure 9:
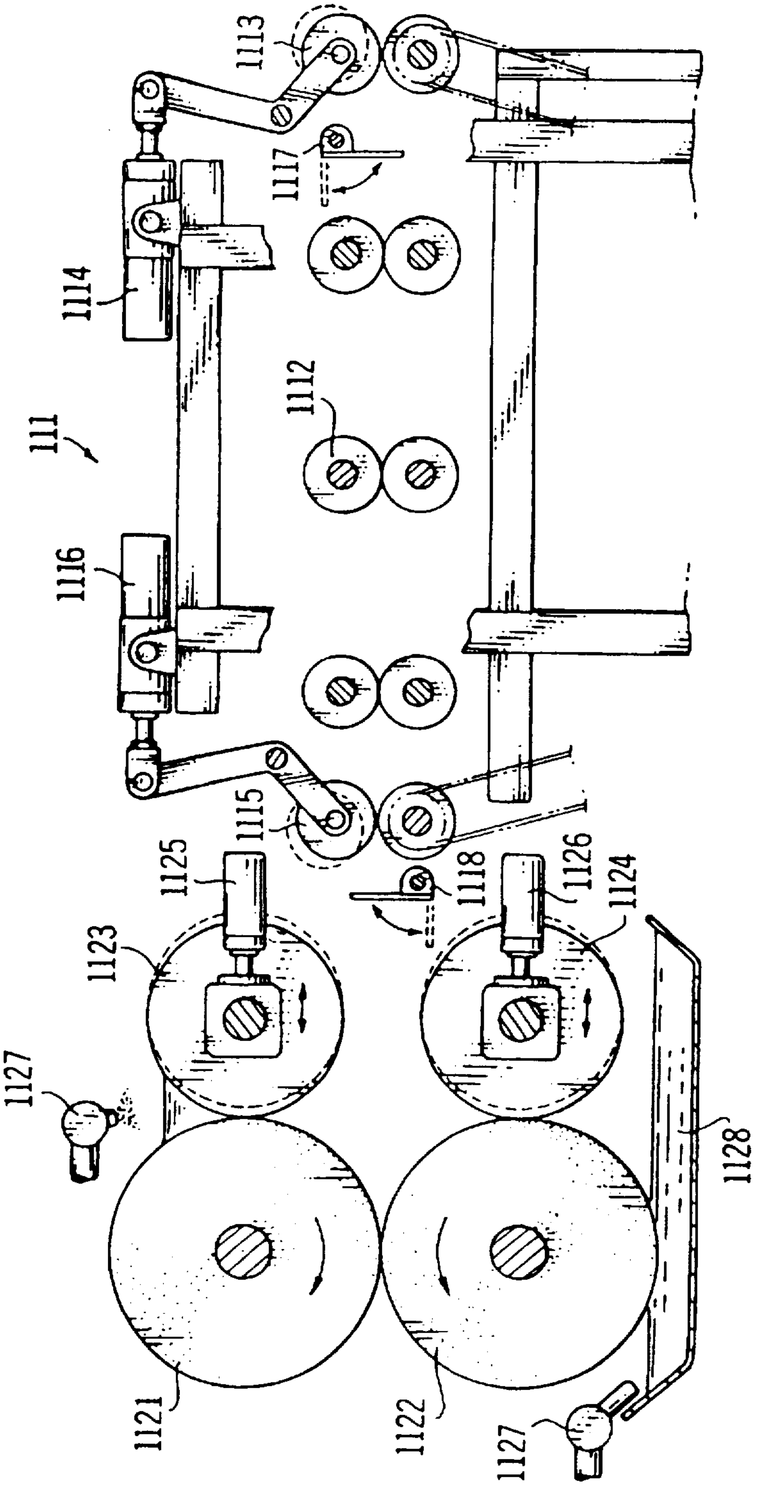
Figure 10A:
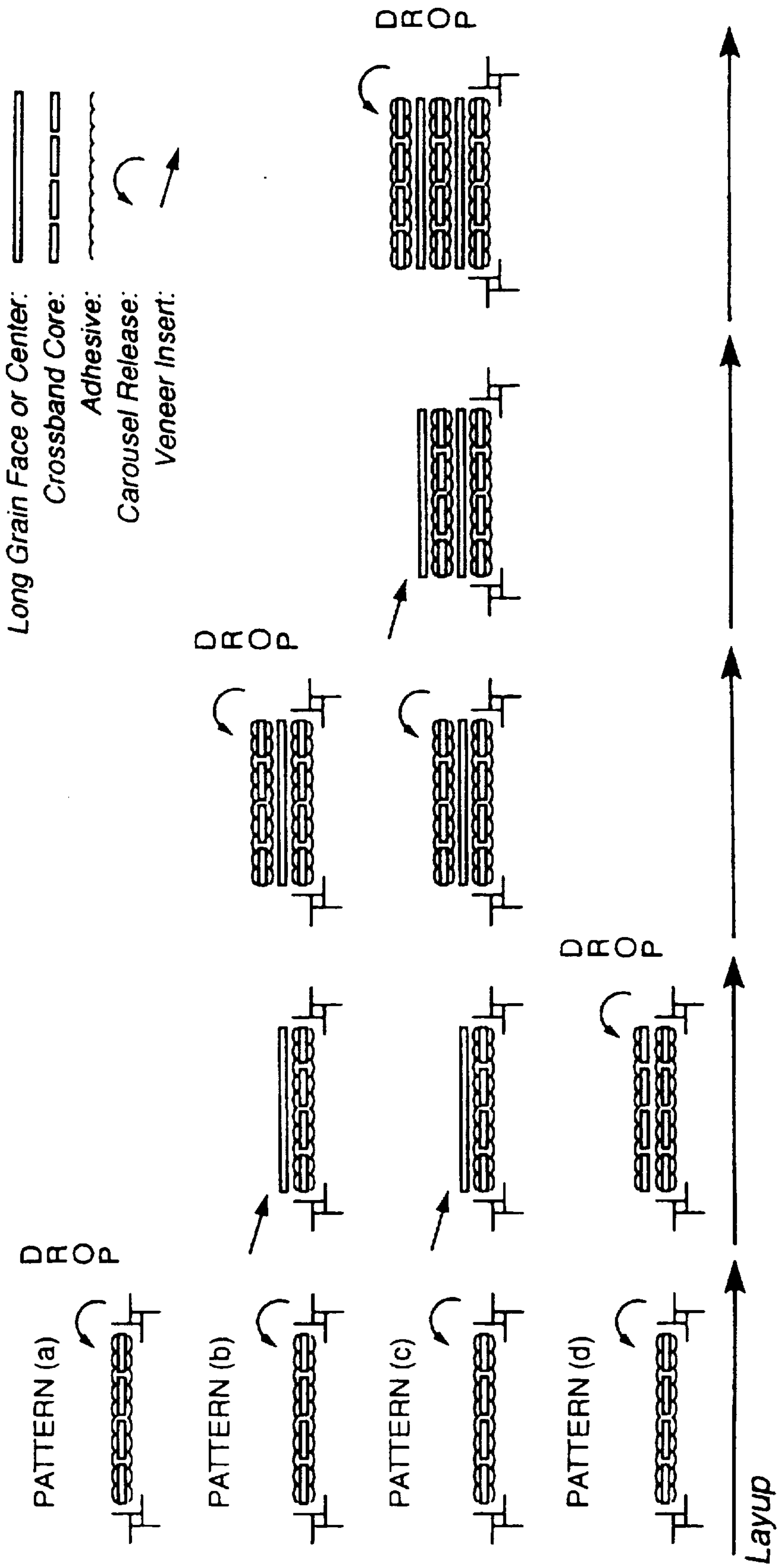
Figure 10B:
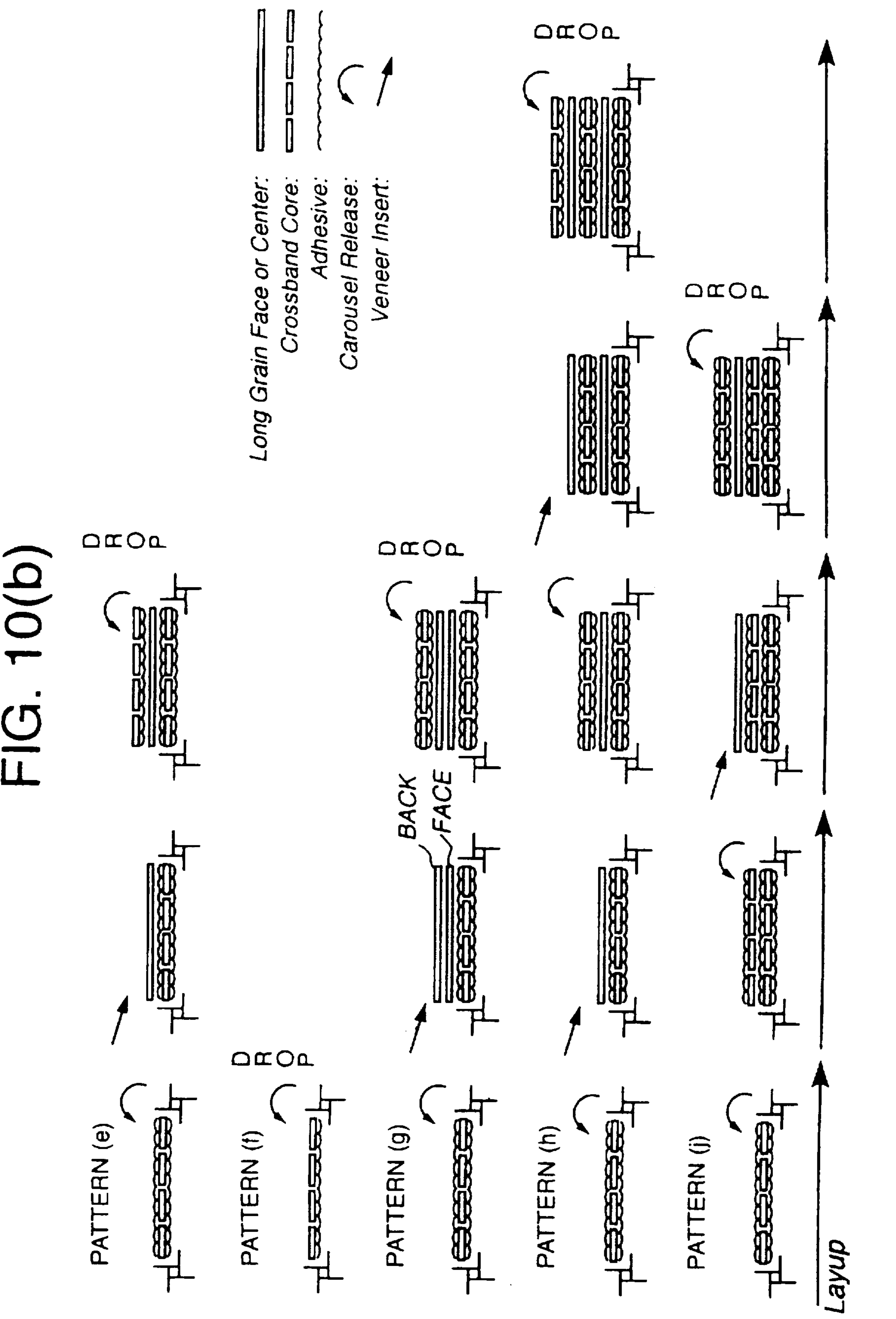
Figure 11:
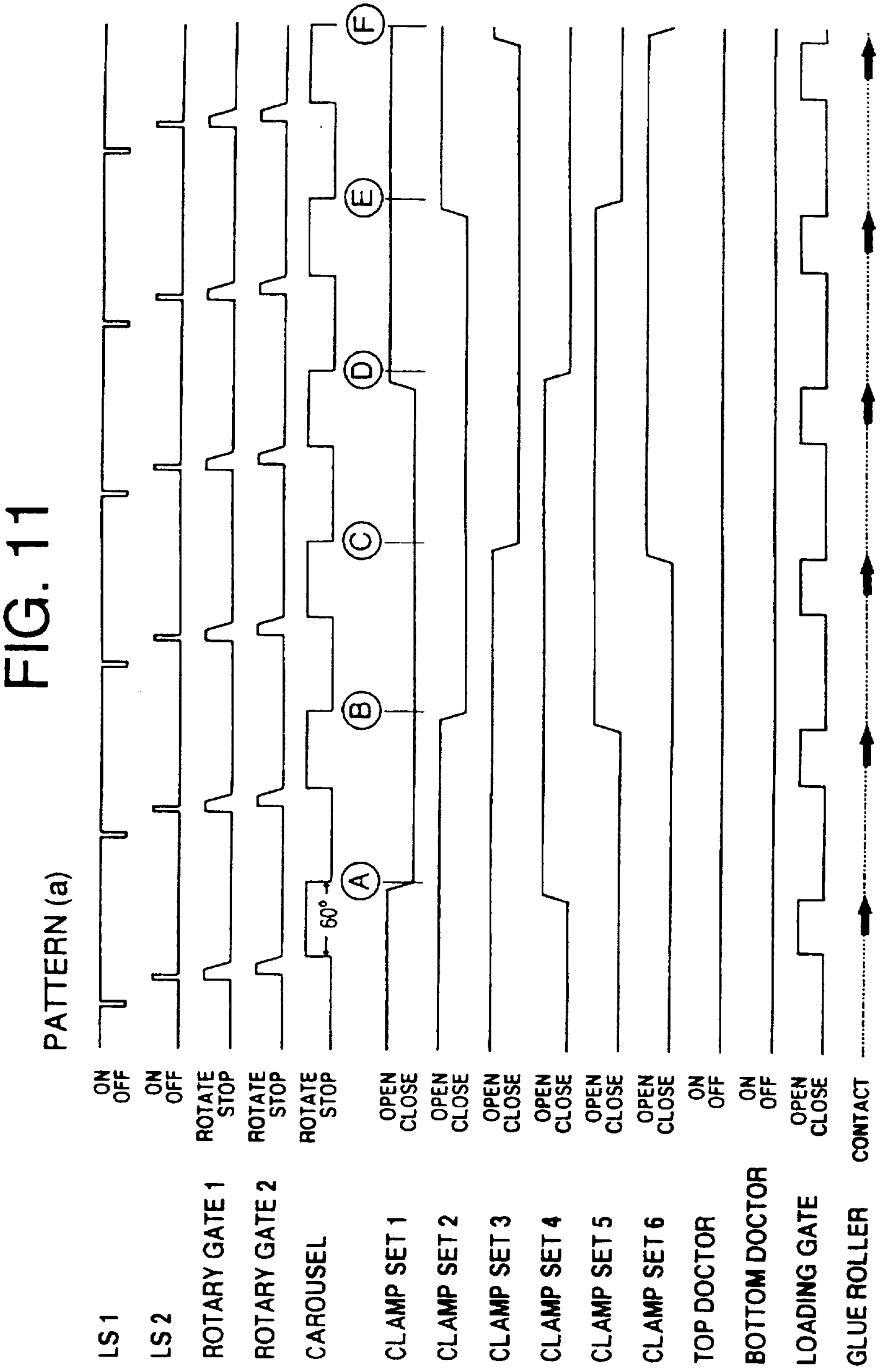
Figure 12:
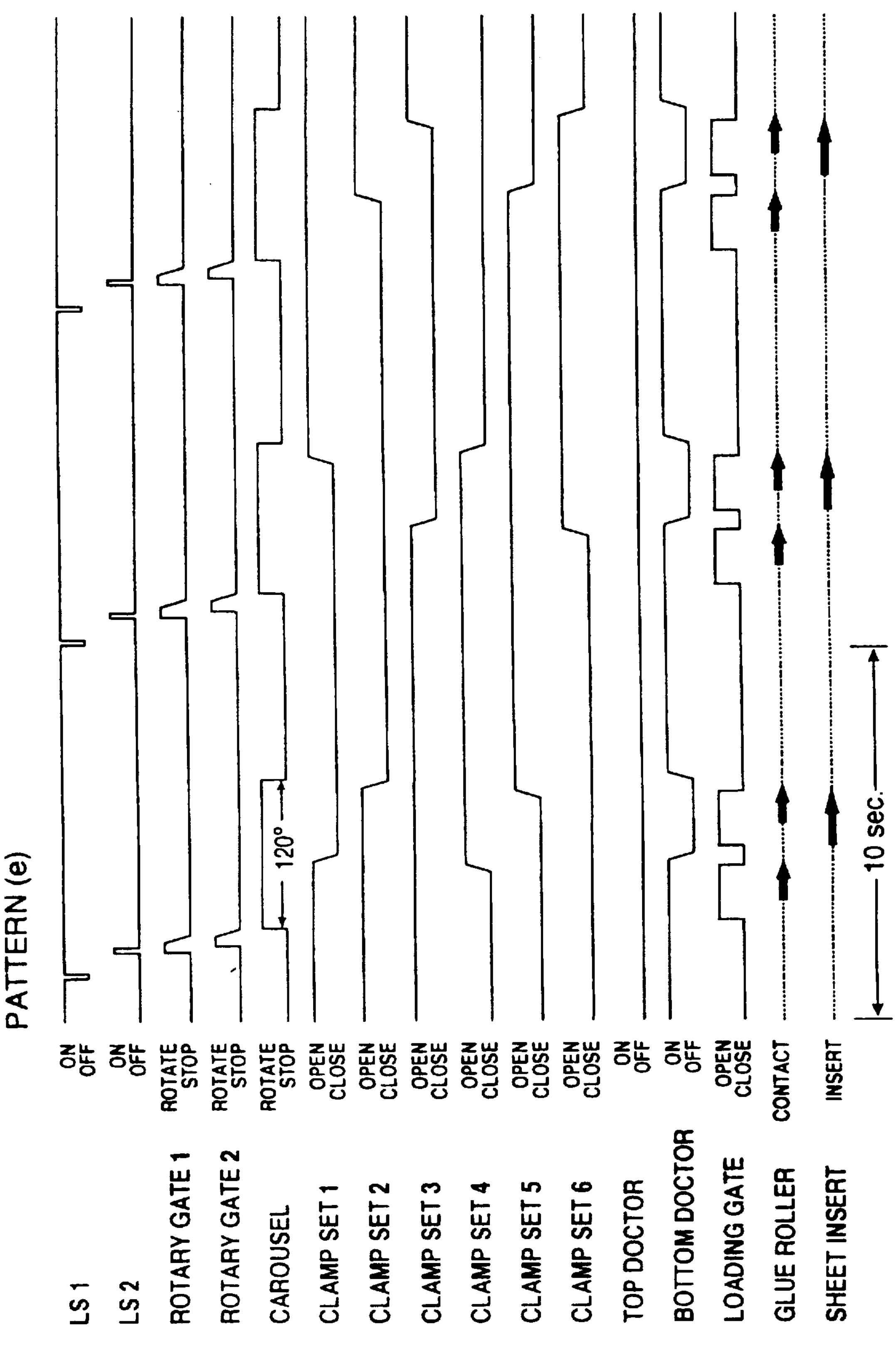
Figure 13:
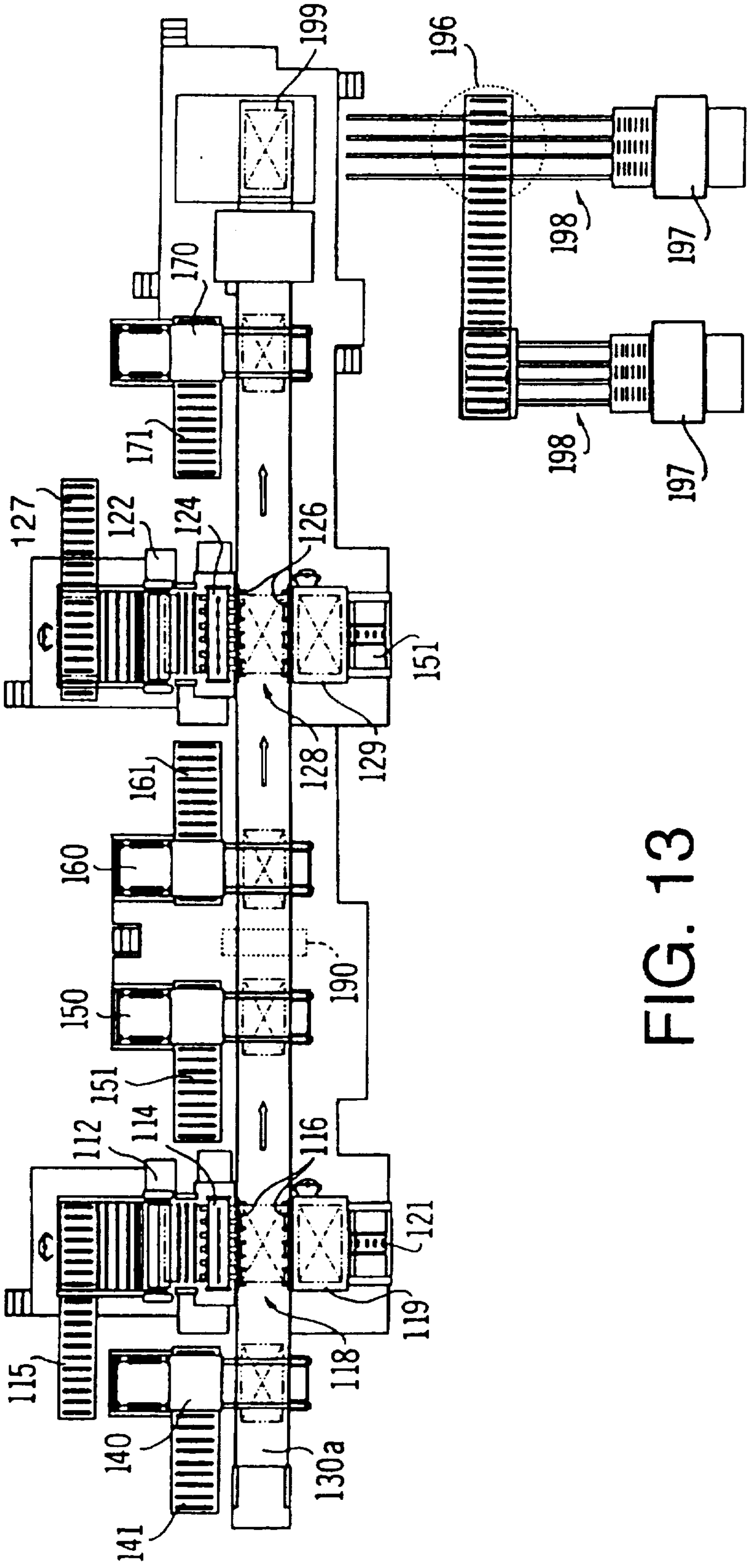
Figure 14:
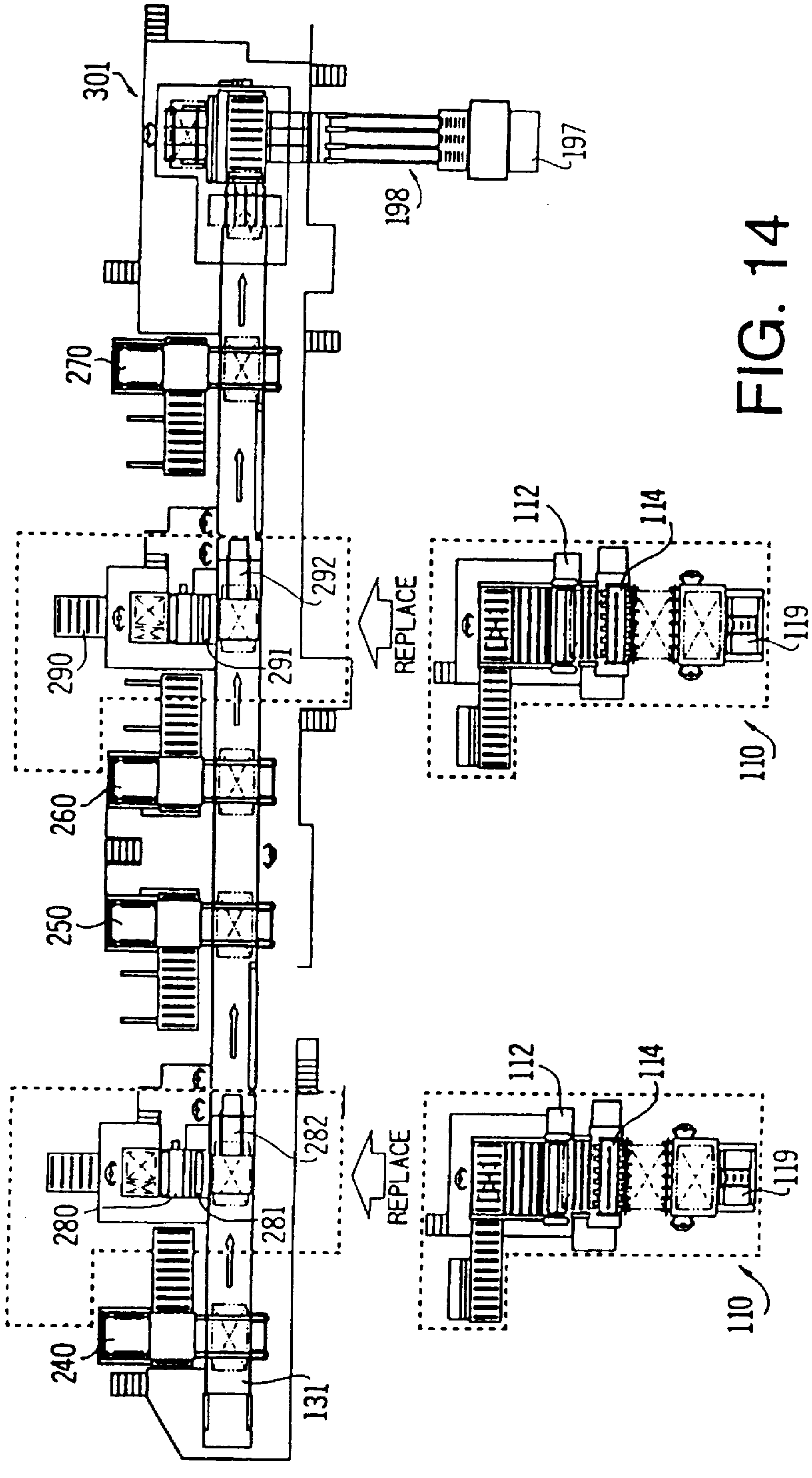

FIGS. 6(*a*) and 6(*b*) shows a schematic view of a cam arrangement used to control relative motion between clamps and a drum of a carousel core feeder;

FIG. 7 shows a perspective view of a rotary drop gate of an accumulator gate system;

FIG. 8 shows a perspective view of a shuttle drop gate of an accumulator gate system;

FIG. 9 is a side schematic view of a glue spreader;

FIG. 10(*a*) and 10(*b*) are a chart showing various accumulated ply assemblies stackable on the accumulator gate system;

FIG. 11 is a timing chart showing the operations of the improved lay-up system during the laying of a first example ply assembly stackable on the accumulator gate system;

FIG. 12 is a timing chart showing the operations of the improved lay-up system during the laying of a second example ply assembly stackable on the accumulator gate system;

FIG. 13 is a schematic layout of the second embodiment of an improved plywood layout system; and FIG. 14 is a schematic layout showing how the improved plywood layout system may be integrated in a conventional conveyor-type lay-up line.

DESCRIPTION OF THE EMBODIMENTS

The first embodiment of a plywood lay-up system 1 according to the invention has significantly improved flexibility and output, yet occupies very little space. As shown in schematic in FIG. 1, the improved lay-up system 1 includes: a chain conveyor 130, a first veneer station (vacuum conveyor 140), a carousel core feeder 112, a veneer insertion station 119, an accumulator gate system 118, a second veneer station (vacuum conveyor 150), and a controller 125. Some elements appearing in FIGS. 1, 2, 13, and 14 are each simplified for clarity. For example, seven escapement arms 1160 (described later) are shown provided to each side of the accumulator gate system, and six clamps 20 in each clamp set of the carousel 118 are shown. However, twelve clamps 20 in each clamp set and thirteen arms 1160 are used in the embodiment, as disclosed in the accompanying description. The number of clamps 20 and escapement arms 1160 is not critical to the invention, except that each must be sufficient to support a ply or stack of plies in the described manner.

The chain conveyor 130 is a conventional conveyor for transporting sheet material, and able to carry enough weight for the maximum capacity of the lay-up system 1. The speed of the chain conveyor 130 is variable, to match the throughput of various plywood assemblies (varying by number and arrangement of plies) along the conveyor 130.

The first veneer station (first vacuum conveyor 140) supplies long grain back plies to the head of the conveyor 130 at a variable rate, and is able to match the feed rate of the conveyor 130. As the back plies, laid end to end by the first vacuum conveyor 140, continue along the conveyor 130, they enter the carousel station 110, shown in perspective in FIG. 2. At the carousel station 110, the carousel core feeder 112 and veneer insertion station 119 work in combination with an accumulator gate system 118.

The carousel core feeder 114 feeds one-piece (spliced) crossband cores to the accumulator gate system 118, and a glue spreader 112 supplying the carousel 114 is able to apply adhesive to either top or bottom sides of a core ply or to both sides of the a core ply. The use of one-piece spliced crossband core results in higher overall quality of the final plywood panels and facilitates handling and assembly during lay-up. The one-piece spliced cores are prepared by a conventional core splicer off-line. In the described embodiment, the one-piece cores are spliced from random fragments of crossband veneer, the fragments clipped, butt-jointed by hot melt glue, and finally longitudinally overlaid with polyester yarn to provide a one-piece core ply that is handled as a sheet. A commercially available core splicer may be used to prepare the one-piece cores. The spliced cores are provided to the rear of the loading system 111 (described later) in a stack.

The accumulator gate system 118 supplies an accumulated ply assembly to the conveyor 130 in synchronization with the position of a passing ply or assembly, and each sequentially supplied ply assembly is aligned with a sequentially passing ply or assembly on the conveyor 130. The second veneer station 150 is downstream from the accumulator gate system 118 along the conveyor 130, and is identically constructed to the first veneer station 140. Finally, the conveyor 130 ends at a bulk accumulator 199.

In the first embodiment of an improved lay-up system, the first veneer station includes a conventional vacuum conveyor 140 ply transfer mechanism supplied by a roll case 141, and controlled by timing sensors (not shown) arranged near the conveyor. The overhead vacuum conveyor is well known in the art. The first vacuum conveyor 140 includes an overhead perforated belt 143 operating transversely to the main conveyor 130, and is able to pick up a long grain ply from a stack adjacent to the conveyor 130. To pick up a ply from the waiting stack, a transfer mechanism 142 selectively depresses one end of the perforated belt 134 onto a waiting stack of long grain plies, and a ply is picked up by the action of a vacuum (not shown) providing suction through the belt. The depressed end of the perforated belt 134 is then returned to a horizontal position, and the belt 134 is then rotated by a motor (not shown). The long grain ply is thereby moved above the main conveyor 130, where it is pushed away from the belt 134 and onto the main conveyor 130 by a kicker mechanism (not shown) provided to the vacuum conveyor. The supply of the long grain back plies by the first veneer station is controlled to be synchronized with the speed of the main conveyor 130 such that back long grain plies are laid substantially end to end on the main conveyor 130 as the conveyor 130 advances. The lay-up system 1 according to the invention is not restricted to the use of an as overhead vacuum conveyor in any long grain veneer station position, but may use any veneer supply apparatus that is able to supply long grain plies sequentially to match the speed of the main conveyor 130.

Figure 3:
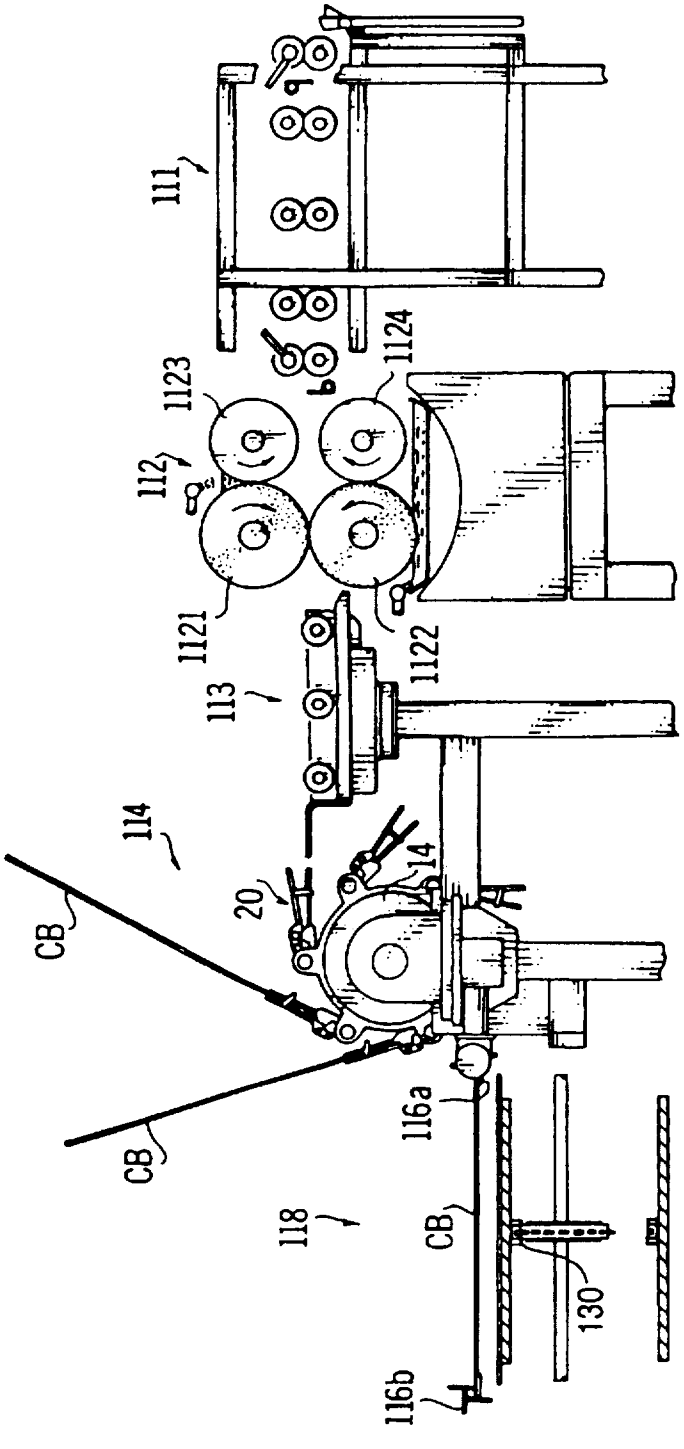
FIG. 3 is a side schematic view of a carousel core feeder and an accumulator gate system.

FIG. 3 shows the general layout of the carousel station 110. The accumulator gate system 118, comprising rotary drop gates **116*a* and 116*b*, is fed glued crossband cores CB released by the carousel 114, which picks up the glued cores CB by means of clamps 20. A set of open clamps 20 aligned with carousel feed rollers 113 is able to receive a glued core CB transported by the carousel feed rollers 113. The glue spreader 112, including spreader rollers 1121, 1122 and doctor rollers 1123, 1124, is able to apply glue to either or both sides of a core CB selectively as the core CB continues to the carousel feeder 113. A loading unit 111, comprising rollers and gates, supplies a core CB to the glue spreader 112 and pushes the core CB through the glue spreader 112. The loading unit 111 automatically receives and advances the cores CB according to appropriate timing, controlled by the controller 125. The cores CB are supplied to a receiving gate 1117 (shown in FIG. 9) of the loading unit 111** by an operator, from a waiting stack of spliced cores CB.

Glue Spreader 112

As shown in FIG. 9, the glue spreader 112 comprises spreader rollers 1121 and 1122, doctor rollers 1123 and 1124, glue supply systems 1127, and loading system 111. Glue is applied in a thick film to both spreader rollers 1121 and 1122, and is transferred in a controlled fashion to a core ply, fed through the spreader rollers 1121, 1122 (by the loading system 111). When glue is to be applied to both sides of a core ply, both doctor rollers 1123 and 1124 are retracted to a predetermined position (an example range is shown by a dashed line in FIG. 9) by air cylinders 1125 and 1126 respectively. The retraction to a predetermined position results in controlled glue application to a controlled thickness (a predetermined amount). The predetermined amount may be selected from none to a target amount, the target amount determined by considering at least the product to be made, environmental conditions, and the type of glue used. When glue is only to be applied to the top of a core ply ("top" with reference to its orientation in the glue spreader 112), the bottom doctor roller 1124 is abutted to the bottom spreader roller 1122 and removes substantially all the glue film applied to the bottom spreader roller 1122, upstream of glue application to the core ply. As the glued core ply is rotated to the accumulator gate system by the carousel 114, the glued side is flipped, and the glued side therefore faces down, becoming the "bottom" side with reference to the accumulator gate system 118. The top doctor roller 1123 may be similarly abutted against the top glue spreader roller 1121 when only the bottom side of a core ply ("bottom" with reference to its orientation in the glue spreader 112) is to be glued. The operation of the air cylinders 1125 and 1126, controlling the application of the doctor rollers 1123 and 1124, is synchronized with the operation of the carousel 114, and selectively controlled for each core ply, to apply glue to each core ply in the correct manner for the chosen assembly pattern being laid on the accumulator gate system 118. Unused glue is filtered and recirculated by a recirculation system (not shown).

The loading system 111, also shown in FIG. 9, includes receiving gate 1117, loading gate 1118, feed rollers 1112, pinch roller sets 1113, 1115 and pinch roller actuators 1114, 1116. As shown in FIG. 9, the pinch roller sets 1113 and 1115 each comprise an upper movable pressure roller and bottom drive roller, the drive rollers each driven by respective motors (not shown). Each successive core ply is placed in the open pinch roller set 1113, abutting the receiving gate 1117, by an operator. When a ply has exited the loading system 111 to be glued, the controller 125 opens the receiving gate 1117 and the actuator 1114 closes the pinch roller set 1113 on the available ply. The pinch roller set 1113 then advances the ply through the feed rollers 1112 into the loading system 111, and through the open pinch roller set 1115, to abut the loading gate 1118, where the ply is stopped. The receiving gate 1117 is again closed and the receiving pinch roller set 1113 is opened by the actuator 1114. When a set of clamps 20 on the carousel 114 approaches a pickup position as the carousel 114 rotates, the loading system 111 is controlled such that loading gate 1118 opens, and the pinch roller actuator 1116 closes the pinch roller set 1115. The loading end pinch roller set 1115 then drives the core ply through the spreader rollers 1121 and 1122. The loading gate 1118 is again closed, and the pinch roller set 1115 is again opened by the actuator 1116. This completes a loading cycle of the loading system 111. The glued ply is further carried by the carousel feed rollers 113 (shown in FIG. 3) and arrives at the carousel 114 in time to be picked up by a set of clamps 20. Thus, the operator may insert the leading edge of a core ply into the loading system at the receiving gate 1117 at any time as long as the receiving gate 117 is closed.

As the carousel 114 is able to transport plies glued on either side or both sides by the glue spreader 112, the capability of the glue spreader 112 to apply glue selectively results in a flexible lay-up system. The glue spreader 112 is able to change the glue application for each ply that is glued, enabling a wide range of products to be assembled by the carousel 114.

Carousel Feeder 114

As shown in FIGS. 2 through 5, the carousel core feeder 114 comprises a cylindrical hollow rotor 10, six sets of clamps 20 evenly distributed about the periphery of the rotor 10, and corresponding clamp drive means 13 mounted in the interior of the rotor 10 for driving each of the sets of clamps 20. The rotor 10 is rotatable, driven by an AC servo motor (not shown), to bring each core ply to the accumulator gate system 118. The rotor 10 may alternatively be driven by a hydraulic motor. The rotor 10 is able to rotate at speeds up to 10 rpm as driven by the motor.

Figure 4:
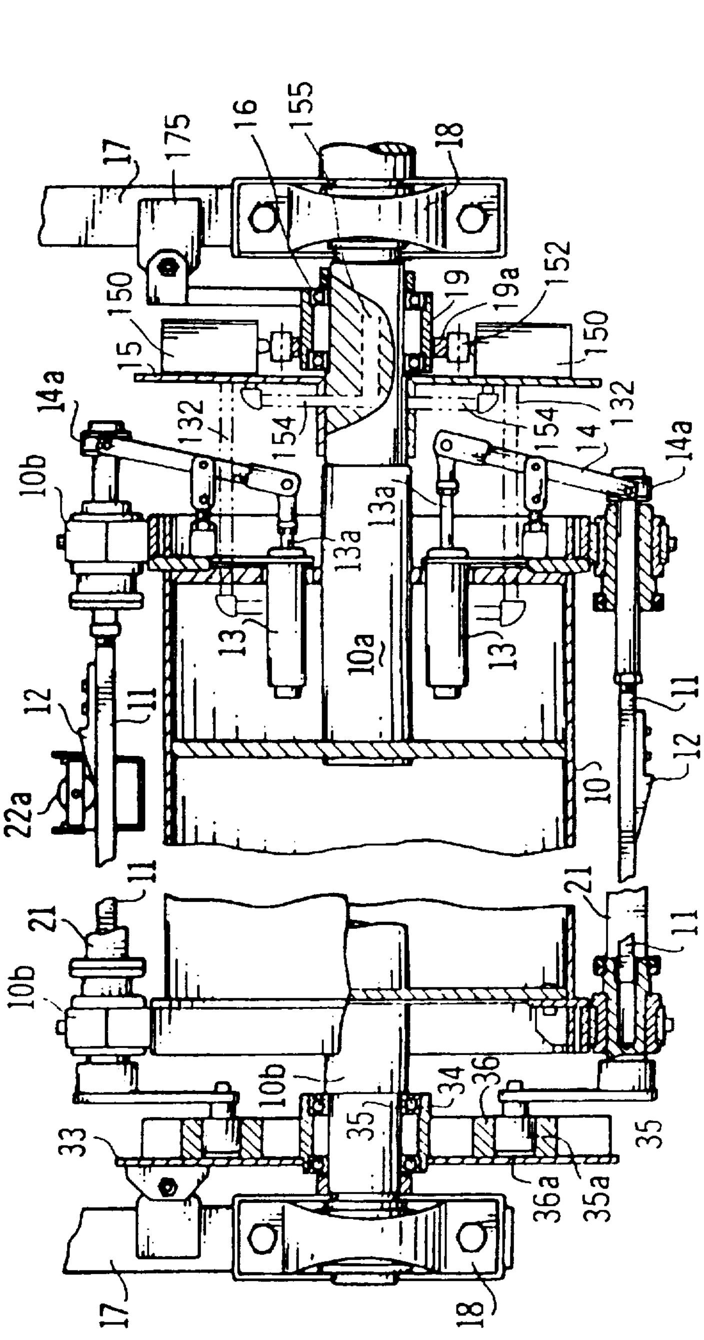
FIG. 4 is a partially sectioned view of a drum of a carousel core feeder, showing a clamp actuating mechanism.

FIG. 4 shows the carousel rotor 10 in cross section. The following description uses left and right directions from the viewpoint of FIG. 4. The hollow rotor 10 is supported on a central shaft 10*a*, which is rotatable by means of bearings 18, 18 at either end. The housings of the bearings 18, 18 are fixed to the carousel base 17.

Air cylinders 13, provided in the hollow interior of the rotor 10, serve to open and close the sets of clamps 20. Each air cylinder has a plunger 13*a* connected to a linkage 14, which is further connected to a slide shaft 11 by means of a bushing 14*a*. The slide shaft 11 is supported at both ends of the rotor 10 to be rotatable and longitudinally movable. The bushing 14*a* allows the slide shaft 11 to rotate relative to the link arm 14, while the link arm 14 moves the slide shaft 11 longitudinally when the corresponding air cylinder 13 is charged. The clamps 20 are arranged along the length of the rotor 10 and supported by a clamp support arm 21, and each slide shaft 11 is provided with slide cams 12 corresponding to each of the corresponding twelve clamps 20. Of course, the invention is not limited to twelve clamps; any number of clamps capable of supporting a core ply is sufficient. The slide cams 12 serve to open and close the clamps 20 by means of cam followers 22*a*, each set of twelve clamps 20 closing when the corresponding air cylinder 13 is charged.

The rotor 10 is provided on the right side with a support plate 15, which is fixed to the rotor 10 via a connecting bar 158. The support plate 15 is rotatable with the rotor shaft 10*a*, and six switchable mechanical air valves 150, are mounted to the support plate 15 corresponding to air cylinders 13. Outputs of the valves 150 are connected to corresponding air cylinders 13 by means of pairs of feed pipes 132, shown schematically in FIG. 4 (the second pipe of each pair is behind the shown pipes 132 in FIG. 4). The valves 140 are supplied with compressed air by means of branch pipes 154 connected a coaxial supply tube 155 provided in a portion of the rotor shaft 10*a*. The feed pipes 132 and branch pipes 154 can be rigid or flexible, as they are not load-bearing.

Each air valve 150 is actuatable by means of a rotatably and movably supported cam follower 152 that pushes on an actuator of the corresponding air valve. An stationary cam support housing 19 allows the rotor shaft to rotate coaxially therein by means of bearings 16, 16, and is held stationary by means of a connecting bar 175 linked to the carousel base 17. The cam support housing 19 supports a control cam 19*a*, and the air valve actuator cam followers 152 follow the control cam 19*a* as the rotor 10 rotates. The shape of the control cam 19*a* is defined such that the air valves 150 (1) actuate the air cylinders in one direction 13, closing the corresponding clamps 20, when each set of clamps is at a pickup position (In FIG. 6(*a*), position A); and (2) actuate the cylinders 13 in the opposite direction to open each set of clamps 20 as each set of clamps 20 approaches a release position (in FIG. 6(*a*), position D). Thus, the opening and closing of each set of clamps 20 is controlled according to the rotational position of the rotor 10.

The rotor 10 is provided on the left side with a guard cam plate 33. The guard cam plate is similarly supported to cam support housing 19 by means of bearings 35 and a bushing 34. However, the guard cam plate 33 has a cam assembly 36 formed therein, comprising a cam groove 36*a*. The cam groove 36*a* serves to guide the relative angle of the sets of clamps 20 to the rotor 10 as the rotor 10 turns. Each clamp support arm 21 is rotatably supported and provided with a follower arm 35 and cam follower 35*a*. Each clamp support arm 21 serves as the rotational axis of the corresponding set of clamps 20, the rotation of the set of clamps relative to the rotor 10. As the rotor 10 turns, the position of each cam follower 35*a* determines the relative angle of each corresponding clamp support shaft 21, and therefore the relative angle of the corresponding set of clamps 20, to the rotor 10.

Figure 5:
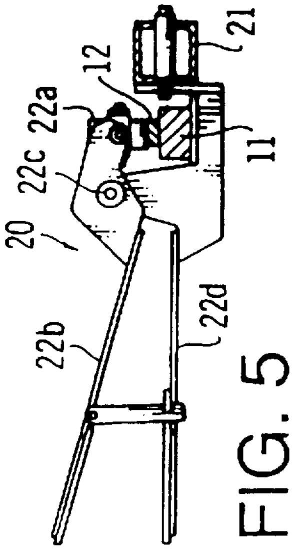
FIG. 5 shows a clamp of a carousel core feeder.

FIG. 5 shows a single clamp 20. The clamps 20 are distributed along the length of the rotor 10 and corresponding core plies to provide sufficient support to lift a core ply by one edge, as the core plies are relatively fragile. Each clamp 20 includes a stable clamp plate 22*d* and a swingable clamp plate 22*b*. Each swingable clamp plate 22*b* is swingable about a shaft 22c and an end of each clamp plate 22b is connected to a corresponding cam follower 22a in contact with the corresponding slide cam 12. A torsion spring (not shown) wound around each shaft 22c forces the swingable clamp plate 22b in an opening direction. The slide cams 12 are supported by the corresponding sliding shafts 11, driven by the corresponding linkages 14, and actuated by the corresponding air cylinders 13.

When a plunger 13a of an air cylinder 13 is extended, the corresponding slide cams 12 are driven to push the cam followers 22a upward, swinging each swingable clamp plate 22b counterclockwise and clamping a core ply. When a plunger 13a of an air cylinder 13 is retracted, the corresponding slide cams 12 are driven to allow the cam followers 22a to return, and the cam followers 22a free the clamp plates 22b so that the swingable clamp plates 22b are rotated by the torsion springs, thereby to release the ply on the accumulator gate system 118.

The carousel 114 enables the feeding of well-aligned one-piece cores to the conveyor 130 or to an accumulator such as the accumulator gate system 118. Furthermore, the timing of the application of cores to the conveyor 130 is easily controlled, allowing a delay in the operation of the carousel 114 for operator inspection and the insertion of long grain plies. In combination with the direct-feed glue spreader 112, the carousel can provide cores glued on either or both sides to the conveyor in a sequence that changes the glue application for each core, resulting in a flexible lay-up system.

Angle Control Cam Assembly 36

As shown in FIGS. 4, 6(*a*) and 6(*b*), the relative angle between each set of clamps 20 and the rotor 10 is controlled cam assembly 36, including a cam groove 36a and six cam followers 35a associated with each of the six cam support arms 21 and sets of clamps 20.

The profile of the cam groove 36a is shown as cam profile 37 in the schematics of FIGS. 6(*a*) and 6(*b*). The cam profile 37 is shaped with such that the clamps 20 move substantially horizontally at ply pickup and release positions, and such the transported core plies are free of the volume above the conveyor 130 for as long as possible so that plies may be placed on the accumulator gate system 118 from the veneer insert station 118.

As shown in FIG. 6(*a*), a relative angle between each set of clamps 20 and the rotor may be defined between the direction of extension each a held ply from the rotational axis (clamp support arm 21) of each set of clamps 20, and an imaginary line between the rotational axis of each set of clamps 20 and the rotational axis of the rotor 10, where the relative angle is the non-reflex angle formed therein. A reflex angle is defined as an angle greater than 180° and less than 360°, and a non-reflex angle is defined as an angle greater than 0° and less than 180°. When a ply is just placed on the accumulator gate system 118 (release position D), the set of following clamps 20 (position A) holds the approaching ply as far as possible from the accumulator gate system 118, and the next set of following clamps 20 (position B) bears another ply. When a ply has just been placed on the accumulator gate system 118 at position D, the receiving set of clamps (pickup position A) has just picked up a ply from the glue spreader 112, and the two following sets of open clamps 20 (positions E and F) are cycling up to the pickup position. The sets of clamps 20 are opened and closed by the air cylinders 13 according to the rotational position of each set.

FIG. 6(*b*) shows the orientation of a single set of clamps 20, according to the cam profile 37, for an entire rotation of the rotor 10. As shown in FIG. 6(*b*), between core pickup and core release, there are four important functional sectors of the cam profile 37 (hatched in FIG. 6(*b*): sector (i) decreases the relative angle between the clamps 20 and rotor 10, so that the clamps move substantially horizontally during core pickup; sector (ii) decreases the relative angle between the clamps 20 and rotor 10, keeping the volume above the accumulator gate system 118 free so that veneer may be inserted and an operator may inspect approaching core plies; sector (iii) increases the relative angle between the clamps 20 and rotor 10, rotating a core ply to a horizontal position at the accumulator gate system 118 relatively quickly; and sector (iv) decreases the relative angle between the clamps 20 and rotor 10, moving the open clamps 20 substantially horizontally during release of the core ply to bring the clamps 20 free of the core ply. Between sectors (i) and (ii), the relative angle between each set of clamps 20 and the rotor 10 increases, rotating the ply relatively quickly between the two sectors of angle decrease, so that a glued core is clear of the pickup region as soon as possible (to prevent jamming with a following glued core ply). The motion of a stable clamp 22d portion is shown to represent a set of clamps 20. The "Optimum Veneer Insertion Range" shown in FIG. 6(*b*) is in sector (ii), where the ends of the held plies approach the accumulator gate system 118 more slowly (angularly) than the rotational speed of the rotor 10.

Thus, even if a glued ply is fed by the carousel 114 to the accumulator gate system 118 and conveyor 130 with a rapid feed rate, the angle control cam assembly 36 holds the approaching plies away from the volume above the accumulator gate system 118, and the volume above the conveyor 130 is largely free, enabling other lay-up tasks to be performed from the opposite side of the accumulator gate system 118. Furthermore, both sides of each cores are visible to operators as the core is swung down to the line, enhancing the ease of inspection of the core quality and glue spread quality.

Accumulator Gate System 118

Figure 1:
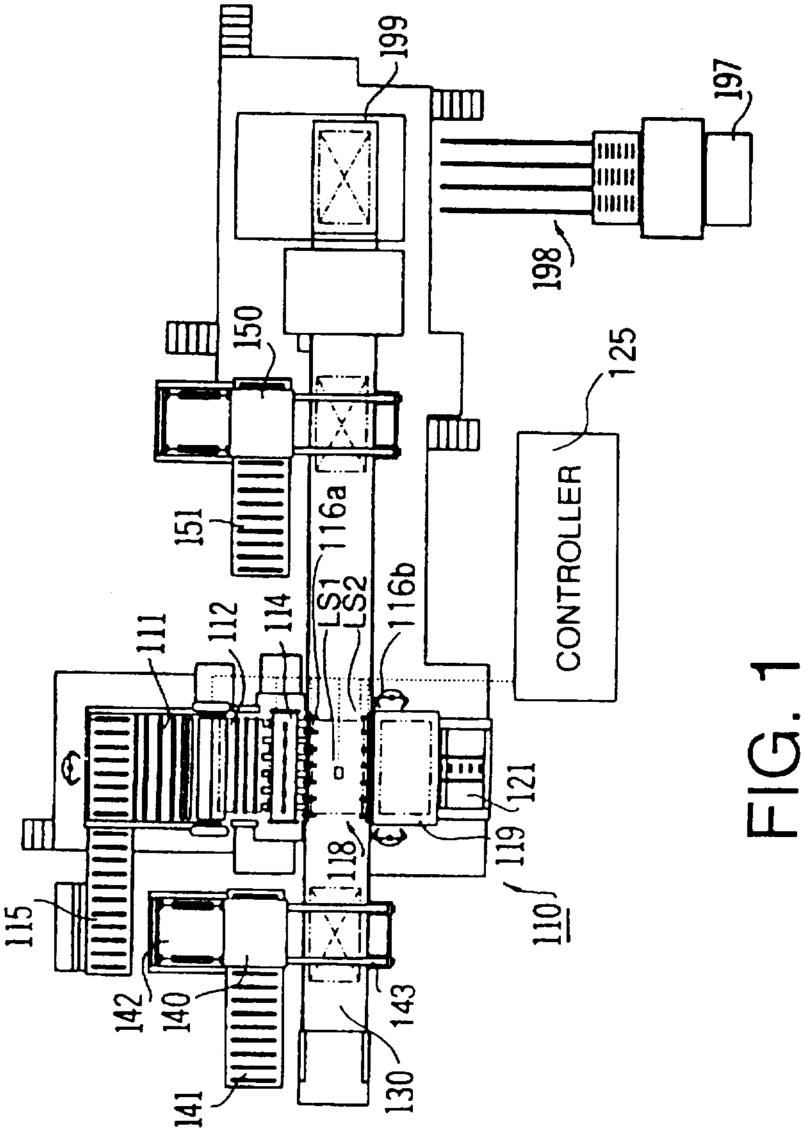
FIG. 1 is a schematic lay-out of the first embodiment of an improved plywood layout system.

The accumulator gate system 118 is used to accumulate an assembly of a variable number of core and long grain plies before laying the assembly on the conveyor 130 below. A first embodiment of the accumulator gate system 118 comprises twin rotary drop gates 116a and 116b (in the arrangement shown in FIG. 3) and is controlled by sensors LS1 and LS2. The position of the sensors LS1 and LS2 is shown in FIG. 1. As the rotary drop gates 116a and 116b are symmetrically constructed, only rotary drop gate 116a is described herein.

As shown in FIG. 7, the rotary drop gate 116a has a plurality of escapement arms 1160 along the length of the conveyor 130. The embodiment uses thirteen such escapement arms 1160. Of course, the invention is not limited to thirteen arms 1160; any number of arms 1160 which is able to support plies adequately is sufficient. Each escapement arm 1160 is shaped as a cross, having four broad holding plates fixed orthogonally to one another, such that a broad holding plate is positioned horizontally and below a released core ply for every 90 degree rotation of an escapement arm 1160. One plate of each escapement arm 1160 is horizontally oriented when a core ply is placed by the carousel 114, and the escapement arms 1160 guide the core ply as it is released. At the same time, a vertical plate provides an aligning edge for a released ply. Each escapement arm 1160 is commonly mounted to a shaft 1162 through the center of the aforementioned cross shape. The shaft 1162 is rotatable (via a coupling 1163) by a servomotor 1164, and may be stopped with two plates of each escapement arm 1160 in a horizontal position and two plates of each escapement arm 1160 in a vertical position. An encoder wheel 1166 is fixed at the end of the shaft 1162, and a proximity sensor 1168 is provided adjacent the encoder wheel 1166. The proximity sensor 1168 generates a "stop" signal when the shaft 1162 has rotated to the correct position for holding a new ply. Opposite the rotary drop gate 116*a* on the other side of the conveyor 130, the second rotary drop gate 116*b* is symmetrically arranged to rotate in the opposite direction.

At positions shown in FIG. 1, sensors LS1 and LS2 are provided along the conveyor 130 near the carousel 114. The sensors LS1 and LS2 are monitored by the controller 125. Sensor LS1 is a limit switch responsive to a ply or assembly travelling along the conveyor 130, and is turned ON when an assembly or ply is present on the conveyor 130. Sensor LS2 is a limit switch responsive to a kick pin (not shown) provided at substantially ply length intervals on the chain conveyor 130, and detects that a back long grain ply or an assembly has reached a predetermined position with respect to the motion of the carousel 114. Alternatively, sensors LS1 and LS2 are photocells. A timer T1 (not shown in FIG. 1) is provided to the accumulator gate system 118, and counts a predetermined (0 to 0.5 seconds) interval when the sensor LS2 is actuated before starting the motor of the rotary drop gate 116 of the accumulator gate system 118. A second timer T2 (not shown in FIG. 1) is provided for counting a predetermined delay (approximately 0.3 seconds) from the start of the first rotary drop gate 116*a* before starting the second rotary drop gate 116*b*. The dropping of one side of a ply assembly before the other ensures that the core is properly aligned, as the first dropping side acts as a reference about which the other dropping side may pivot. The accumulator gate system 118 is controlled by the controller 125 (FIG. 1) such that the second rotary drop gate 116*b* places the remaining edge of a held assembly of plies following the predetermined delay counted by timer T2, after the first rotary gate 116*a* drops the first side of the stack. The carousel 114, including the glue spreader 112, is controlled by the controller 125 in response to the rotation of the rotary gates 116*a* and 116*b*, to synchronize the feed rate and timing of the carousel 114 with that of the conveyor 130 and the accumulator gate system 118. The number of plies assembled on the accumulator gate system 118, or the presence of a ply on the accumulator gate system 118, is monitored by the controller 125 by checking the passage of the core plies through the glue spreader 112 (at the glue spreader loading system 111) and by monitoring the rotation of the carousel 114. In this way, the accumulator gate system 118 does not release the accumulated assembly of plies when, for example, a core ply is not fed to the carousel 114 in time for the next carousel 118 advance. When sensor LS1 is OFF, and sensor LS2 is ON, the accumulator gate system 118 does not drop a held ply or assembly, inhibited by the controller 125. When sensor LS1 is ON, indicating a ply or stack is beneath the accumulator gate system 118, and the controller 125 determines that no core ply is present on the accumulator gate system, the conveyor 130 is stopped until after a core ply is brought by the carousel 114 to the accumulator gate system 118.

A second embodiment of the accumulator gate system 118 is possible by replacing the second rotary drop gate 116*b* with a shuttle drop gate 117. Although the twin rotary gates 116*a* and 116*b* are preferred, FIG. 2 shows the second embodiment using a shuttle drop gate 117 for illustration purposes.

Figure 2:
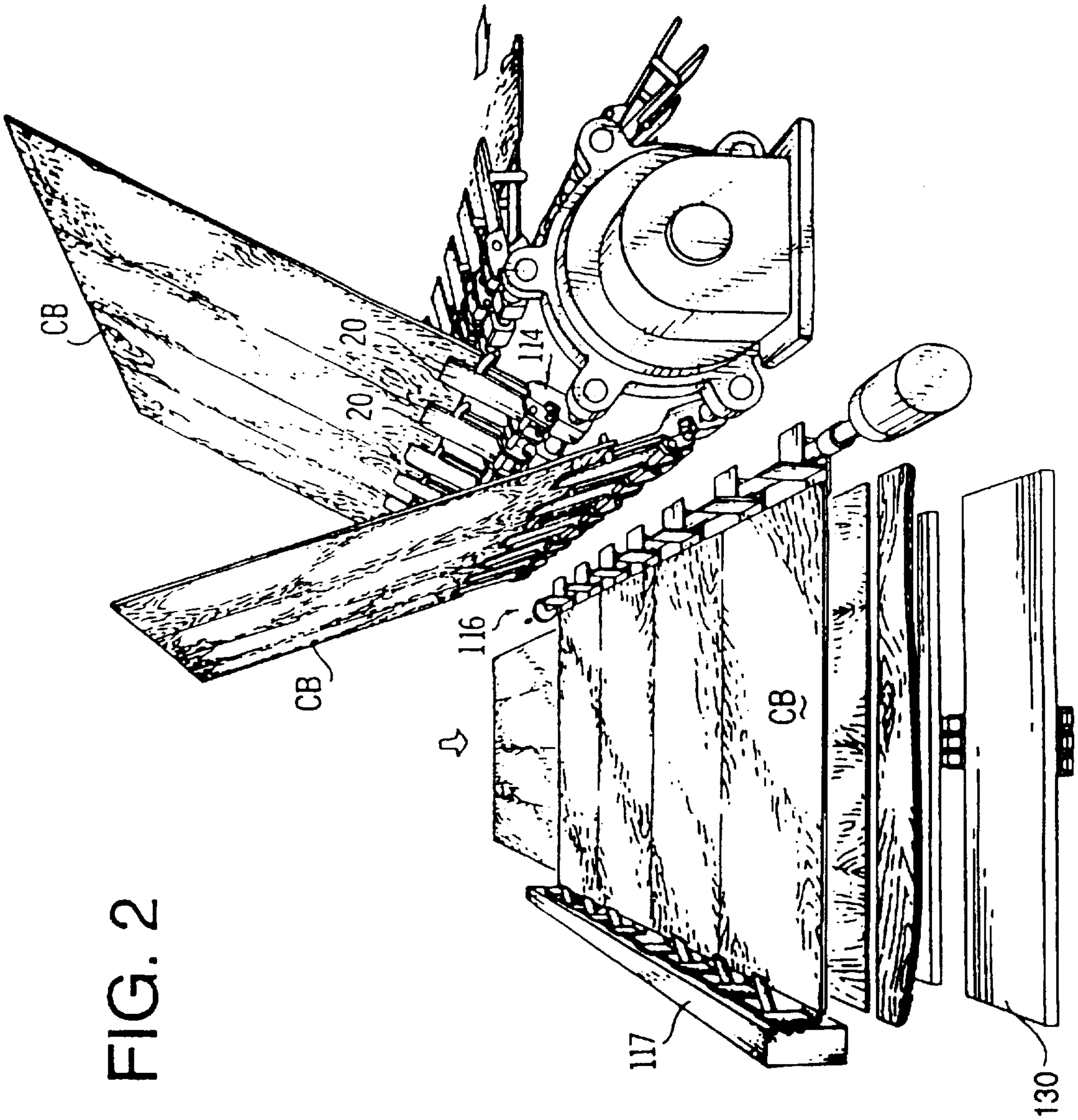
FIG. 2 is a perspective view of a carousel core feeder and accumulator gate system.

As shown in FIGS. 2 and 8, the shuttle drop gate 117 comprises twelve L-arms 1170, and pusher arms 1177 provided in two sets 177 of three pusher arms 1177. Again, the invention may use any number of arms 1170 capable of supporting plies. The L-arms are spaced along the length of a common shaft 1172 opposite the carousel 114, and the pusher arms 1177 are interspersed with the L-arms 1170 along the length of the shaft 1172. A distal end of one arm of each L-arm 1170 is fixed to the common shaft 1172, and the remaining arm is horizontally oriented to support a dropped ply when the fixed arm is vertically oriented. The L-arms 1170 are swingable between a) the described position for holding an assembly of plies, where the unfixed arm of each L-arm 1170 is horizontal and the fixed arm is vertical, and b) a tilted position allowing the placing an assembly of plies onto the conveyor 130. The shaft 1172 of the shuttle drop gate is moved by an air actuator 1174 attached to a shaft arm 1173. The pusher arms sets 177 are connected to a second shaft 1179, and the second shaft 1179 is controlled by a second air actuator 1178. The pusher arms 1177 serve to push the shuttle gate side of the top of an assembly of plies onto the passing conveyor 130 (and passing ply or assembly) in synchronization with the leading edge of a passing ply or assembly, and are actuated by the second air actuator 1178 after the L-arms 1170 have substantially released the ply.

The accumulator gate system 118, whether using rotary drop gates or shuttle drop gates as described, enables the accumulation of a large portion of any plywood assembly above the conveyor 130, before allowing the accumulated plies to be laid on the conveyor 130 in a controlled manner. Thus, the accumulator gate system 118 allows the integration of a fast feeding apparatus, such as the carousel 114, to a conveyor-type system. In combination with the carousel 114, it permits the assembly of multiply stacks before supplying the stack to the conveyor 130, enabling both complex ply assembly and rapid ply assembly. Furthermore, the combination of the carousel 114 and the accumulator gate system 118, although having a high feed rate, has no rapidly moving parts or high-speed transport of plies or assemblies, and is therefore a "gentle" lay-up system, reducing reject rates and wastage. Thus, the combination of the carousel 114, accumulator gate system 118, and conveyor 130 allows the rapid assembly of a wide range of plywood products.

The veneer insertion station 119 is provided across the conveyor 130 opposite the carousel 114 for putting an insert (long grain) ply or plies on top of the ply or assembly resting on the accumulator gate system 118. In the embodiment, the veneer insertion station 119 comprises a roll case 131 and scissor lift, and the long grain plies are manually placed from a stack on the scissor lift onto the accumulator gate system 118 by an operator or operators. However, an automatic center feeding machine could be implemented at the veneer insertion station 119 without departing from the spirit or scope of the invention.

In combination with the carousel 114 and accumulator gate system 118, the use of a veneer insertion station enables the high-speed and high-volume production of complex ply assemblies. The combination is able to assemble at least 5 plies of long grain face or center, interspersed with cross-band core, allowing the ply assembly to continue in the lay-up process. When provided with veneer stations on either side of a conveyor 130, the combination can easily produce complex or simple plywood products at high rates. As the veneer insertion station 119 is advantageously provided opposite the carousel 114 and adjacent the accumulator gate system 118, and uses both sides of the conveyor 130, the combination occupies little space in a facility.

The second veneer station is arranged over the conveyor 130 downstream of the carousel station 110. The second veneer station is identical to the first veneer station in the embodiment, including a second vacuum conveyor 150 supplied by a roll case 151 and controlled by timing sensors (not shown). The second vacuum conveyor 150 selectively supplies long grain plies to each passing ply assembly on the conveyor 130 at a variable rate, matchable to the feed rate of the conveyor 130. As previously described, the invention is not restricted to the use of an overhead vacuum conveyor in the second veneer station position.

A conventional bulk accumulator 199 is at the downstream end of the conveyor line 130. The bulk accumulator 199 stores assembled plies until a large number are accumulated, then the stacked ply assemblies are moved by a conventional material handling system 198 and then processed in a typical press 197.

The operation of the improved lay-up system can be shown with reference to FIG. 1. As shown in FIG. 1, a back long grain ply is fed to the chain conveyor 130 by the first veneer station 140 placed upstream of the conveyor 130. One-piece crossband core plies are continuously fed to the glue spreader 112, and the core plies are selectively glued on either or both surfaces by the rollers 1121, 1122 of the glue spreader 112. The glued core ply is then fed to the carousel 114. As each glued core ply is supplied from the glue spreader 112, a row of clamps 20 is placed at a receiving position, shown in FIG. 3, in line with the plies as they exit the glue spreader 112. The corresponding air cylinder 13 is charged, clamping the core ply, and the rotor 10 is rotated.

After clamping each core ply, the carousel 114 rotates each clamped core ply to the accumulator gate system 118 in response to the operation of the accumulator gate system 118. As each core ply eventually rotates to the releasing position above the gate system 116, the corresponding air cylinder 13 discharges, and moves the corresponding slide cams 12 to release the swingable clamp plates *22b*. In this step, the swingable clamp plates *22b* are positioned lower than the stable clamps *22d*, and when the swingable clamp plates *22b* are released, the swingable clamp plates *22b* are swung downward by the bias of torsion springs (not shown), releasing the ply. The core ply is thereby placed on the accumulator gate system 118. Meanwhile, according to appropriate timing, the third following set of clamps 20 receives the next adhesive-bearing core ply, and two plies are held suspended and substantially clear of the volume above the conveyor 130 as shown in FIGS. 2 and 3.

The operation of the carousel 114 can be repeated without releasing the accumulator gate system 118, so that two or more plies may be stacked on the gate 116. Furthermore, long grain veneer inserts can be supplied at this point, interspersed with the plies supplied from the carousel 114, from the veneer insertion station 119. The rotation of the carousel 114 and release of the accumulator gate system 118 is set according to the pattern selected at the controller to allow inserts and the accumulation of multiple ply assemblies. The rotation of the carousel 114 is stopped and started in response to the accumulator gate system 118, and the amount of rotation (60°, 120°, for example) is controlled according to the pattern selected at the controller 125 such that plies may be inserted from the veneer insertion station 119 during or following rotations of the carousel 114.

The elements of the carousel 114, conveyor 130, glue spreader 112, and accumulator gate system 118 are controlled by a conventional programmable logic controller 125 (shown in FIG. 1) in response to the described sensors LS1, LS2 and the operations of other elements, and the necessary timing and synchronization signals are sent by the controller 125 to maintain the appropriate timing. The pattern of operation for the carousel 114 and accompanying glue spreader 112 are controllable and selectable by means of the controller 125, to allow the assembly of various patterns of core and long grain plies on the accumulator gate system 118.

Using an example limit of five plies on the accumulator gate system 118, several assembly patterns (for example) can be made:

(a) a core with both surfaces glued;

(b) a core with both surfaces glued, followed by a center insertion, then another core with both surfaces glued;

(c) a core with both surfaces glued, followed by a center insertion, another core with both surfaces glued, a center insertion, and another core with both surfaces glued;

(d) a core with both surfaces glued, followed by a core with the top surface only glued;

(e) a core with both surfaces glued, followed by a center insertion, then a core with the bottom surface only glued;

(f) a core with the bottom surface only glued;

(g) a core with both surfaces glued, followed by a face and back long grain sheets inserted together, then another core with both surfaces glued;

(h) a core with both surfaces glued, followed by a core with the top surface only glued, then a center insertion, then another core with both surfaces glued; and (j) a core with both surfaces glued, followed by a center insertion, another core with both surfaces glued, a center insertion, and a core with only the bottom surface glued.

The nine example assembly patterns are shown in FIGS. 10(*a*) and 10(*b*), from first ply laid on the accumulator gate system 118, to just prior to the release of the accumulator gate system 118 (denoted by DROP).

Some of the described assembly patterns are useful in combination with a back veneer station preceding the accumulator station and a face veneer station following the accumulator station along the conveyor 130, while others are useful when two improved lay-up systems of the described embodiment are arranged in tandem along the same conveyor 130 (described later).

For example, in the case of pattern (b), the process is such that the glued core is laid on the accumulator gate system 118, a center sheet is inserted from the veneer insert station 119 (opposite the carousel 114) onto the accumulator gate system 118, and then the next glued core ply is rotated and placed on top of the inserted center ply by the carousel 114. The center long grain ply may be inserted while the carousel 114 is rotating or while stopped, depending on the available time for the selected pattern.

The assembly pattern (a)~(j) to be stacked using the carousel 114, accumulator gate system 118 and veneer insert station 119 is selected by a selector switch (not shown) associated with the controller 125.

Example timing charts that show the approximate relative timing of the various elements of the lay-up system 1 for assembly patterns (a) and (e) appear in FIGS. 11 and 12, respectively. The output of the sensors LS1 and LS2 is monitored by the aforementioned controller 125, and the accumulator gate system 118 is controlled in response to the sensors LS1 and LS2. The carousel 114 starts rotating in response to the accumulator gate system 118. Alternatively, the carousel is controlled according to the sensors LS1 and LS2, as the speed of the accumulator gate system 118 is known. The carousel 114 rotates by a predetermined amount and at a predetermined speed, and the accompanying glue spreader 112 glues the plies appropriately, controlled by the controller 125 according to the selected assembly pattern. Assembly patterns (a) and (e) are given as illustrative examples, and the other possible patterns are controlled in a similar manner. Pattern (e) is primarily used with the tandem system 2 (described later).

Pattern (a) is the simplest pattern, placing a single core ply on the sheet and then releasing it in synchronization with each passing back ply. The positions "A" through "F" of FIG. 6(*a*) are shown for "Clamp 1" in FIG. 11. The carousel 114 rotates with a 2 second ON, 2.5 second OFF duty cycle when set to pattern (a), rotating in 60 degree intervals at a speed of approximately 5 rpm when ON. Of course, this duty cycle and speed is merely an example, and the rotation cycle and speed are adjustable as described. The OFF portion of the carousel 114 duty cycle is used to insert center or face plies from the veneer insertion station 119. However, as previously described, the angle of an approaching set of clamps 20 and held ply is controlled by the cam assembly 36 to allow access to the accumulator gate system 118 even when the carousel 114 is rotating.

If the limit switch LS1 is ON, showing that a back ply is present, then when the leading edge of the back sheet borne by the conveyor 130 pushes limit switches LS2, the timer T1 is started. When T1 is finished counting, the first rotary gate 116*a* begins to rotate (and timer T2 is started) to drop one edge of the assembled plies waiting on the accumulator gate system 118 on the passing back ply. The rotary drop gate 116 is rotated by 90 degrees to drop one edge of the assembly of plies in the accumulator gate system 118 onto the passing back long grain ply or assembly on the conveyor 130. When timer T2 is finished, the second rotary gate 116*b* (or alternatively, the shuttle gate 119) is started, and drops the remaining edge of the assembled plies onto the passing back ply such that the edges of all the plies are aligned. At this point, the carousel 114 is rotated to bring a set of clamps 20 to the release position "D". When the carousel 114 approaches the release position and the rotary gates 116*a* and 116*b* have completed their 90 degree rotations, the set of clamps 20 approaching the release position "D" are opened. Meanwhile, the loading gate 1118 has allowed the next core ply to be glued by the glue spreading rollers 1121, 1122. Another set of clamps 20 approaching a pickup position is closed at the end of the carousel 114 rotation, picking up a glued core ply.

The second veneer station 150 is provided downstream of the carousel 114, and is able to feed a long grain veneer sheet (face ply) onto the assembled plies conveyed, such that the assembly of plies conveyed to the end of the conveyor 130 is a complete plywood assembly ready for further processing.

Finally, the assembled plies are collected at the bulk accumulator 199 at the downstream end of the conveyor line 130. The bulk accumulator 199 stores assembled plies until a large number are accumulated, then the assembled and stacked ply assemblies are taken by the material handling system 198 and subsequently processed in the press 197.

In this manner, the system can provide, for example, at least seven assemblies of sheet lay-up:

| Assembly | #1 Sheet Station | Carousel 1 | #2 Sheet Station |
|---|---|---|---|
| S 3 ply | Back | Pattern (a) | Face |
| S 4 ply | Back | Pattern (d) | Face |
| S 5 ply | Back | Pattern (b) | Face |
| D 3 ply | Back | Pattern (g) | Face |
| M 6 ply | Back | Pattern (h) | Face |
| 6 ply ECF | Back | Pattern (j) | |
| S 7 ply | Back | Pattern (c) | Face |

"S" denotes "Single", "D" denotes "Double", "M" denotes "Modified", and "ECF" denotes "Exposed Core Face". A "double" lay-up stacks two identical ply assemblies, one on top of the other, and sends the double assembly stack along the conveyor 130 to the bulk accumulator 199.

Automatic control of the set patterns, in response to the sensors L1 and L2, therefore allows the glue spreader 112, carousel 114, and center sheet station 119 to assemble at least the above described products easily and quickly. The use of both sides of the conveyor 130 optimizes usable floor area, and permits the installation of the improved lay-up system in a limited space, or more than one lay-up line in an existing facility. With the addition of the accumulator gate system 118, the complete system 1 can lay-up complex assemblies (such as 7 ply) or high volume assemblies (such as double 3 ply) with only three stations, while maintaining the high rate of production characteristic of much longer conveyor-type lay-up lines.

Tandem System

The previously described elements of the first embodiment of an improved lay-up system 1 can be serially arranged, such that two or more carousels, accumulator gate systems, and associated veneer stations are sequentially arranged along a single conveyor.

As shown in FIG. 13, to implement this second embodiment of an improved lay-up system (tandem system 2), a third veneer station (vacuum conveyor 160), a second carousel core feeder 124 (identical to carousel 114), a second veneer insertion station 129 (identical to veneer station 119), a second accumulator gate system 128 (identical to accumulator gate system 118), and a fourth veneer station (vacuum conveyor 170) are added to an extended conveyor 130*a* (replacing conveyor 130), following the second veneer station 150 as described in the first embodiment. The vacuum conveyors 160 and 170 are identical to the previously described 140, 150. As in the first embodiment, the conveyor 130*a* in the second embodiment is speed-controlled according to product. Furthermore, the second embodiment is provided with identical sensors (LS1, LS1, not shown in FIG. 13) and controllers (as previously described controller 125, not shown in FIG. 13) to the first embodiment for each carousel 114, 124, and accumulator gate system 118, 128. Similarly to the previously described carousel 114 and glue spreader 112, the second carousel 124 (with glue spreader 122), in combination with the second veneer insertion station 129, is able to supply at least nine possible assembly patterns of assembled core plies and long grain plies to the second accumulator gate system 128. Each rotary drop gate 116, 116 of FIG. 13 is identical to the rotary drop gates 116*a*, 116*b* of FIG. 1. The second accumulator gate system 128 comprises two rotary drop gates 126, 126, identical to the rotary drop gates 116, 116 of the first accumulator gate system 118. The veneer stations and carousels are supplied at roll cases 141, 115, 151, 161, 127, and 171.

The third veneer station (third vacuum conveyor 160) is able to provide face, back or center sheets to a passing assembly of plies, similar to the second veneer station (second vacuum conveyor 150). The second carousel 124 and accumulator gate system 128 are controlled in a manner analogous to the first embodiment as an assembly of plies borne from the third veneer station (at third vacuum conveyor 160) triggers limit switches (again designated by function as LS1 and LS2, not shown in FIG. 13) placed near the second carousel 124. A second set of rotary drop gates 126 is rotated according to appropriate timing as previously described for the rotary drop gates 116, and a second ply assembly is placed on the passing assembled plies on the conveyor 130*a*, such that the edges of the passing assembled plies and those of the second ply assembly are aligned.

The fourth and final veneer station (fourth vacuum conveyor 170) is able to provide face sheets to a passing assembly of plies similarly to the second veneer station. Finally, the finished ply assemblies are stacked at a bulk accumulator 199 at the downstream end of the conveyor line 130*a*. The bulk accumulator 199 stores assembled plies until a large number are accumulated, then the assembled and stacked plies are taken by a conventional material handling system 198 (with turntable 196) and subsequently processed in typical presses 197, 197. In this case, two presses 197, 197 are shown to allow for the doubled basic capacity of the tandem system 2.

As a result of the combination of two carousels 114, 124, two accumulator gate systems 118, L24 and associated elements, the tandem system 2 can lay-up at least 15 practical assemblies:

| Product | #1 Sheet Station | Carousel 1 | #2 Sheet Station | #3 Sheet Station | Carousel 2 | #4 Sheet Station |
|---|---|---|---|---|---|---|
| D 3 ply | Back | Pattern (a) | Face | Back | Pattern (a) | Face |
| D 4 ply | Back | Pattern (d) | Face | Back | Pattern (d) | Face |
| S 5 ply | Back | Pattern (a) | Center | | Pattern (a) | Face |
| D 5 ply | Back | Pattern (b) | Face | Back | Pattern (b) | Face |
| M 6 ply | Back | Pattern (d) | Center | | Pattern (a) | Face |
| 6 ply ECF | Back | Pattern (b) | Center | | Pattern (f) | |
| S 7 ply | Back | Pattern (b) | Center | | Pattern (a) | Face |
| D 7 ply | Back | Pattern (c) | Face | Back | Pattern (c) | Face |
| 7 ply ECF | Back | Pattern (d) | Center | | Pattern (e) | |
| 7 ply ECF | Back | Pattern (e) | | | Pattern (e) | |
| S 8 ply | Back | Pattern (e) | | | Pattern (b) | Face |
| 8 ply ECF | Back | Pattern (b) | Center | | Pattern (e) | |
| 9 ply | Back | Pattern (b) | Center | | Pattern (b) | Face |
| 10 ply ECF | Back | Pattern (c) | Center | | Pattern (e) | |
| 11 ply | Back | Pattern (c) | Center | | Pattern (b) | Face |

Again, "S" denotes "Single", "D" denotes "Double", "M" denotes "Modified", and "ECF" denotes "Exposed Core Face".

Using the tandem system 2, other patterns of assembly from the previously described patterns (a) through (j) become useful. The carousels may both assemble the same pattern, or each may assemble different patterns. When different patterns are used on each carousel, a wide range of complicated final assemblies are possible. For example, pattern (c), as previously described, is useful for 7, 8, and 10 ply assemblies. Pattern (e), shown in FIG. 12, is different from the previously described pattern A in that the conveyor 130 is slowed down to half speed, as pattern (e) is intended for production of more complicated, larger assemblies. Furthermore, for pattern (e), the carousel 114 (or 124) is rotated by 120 degree intervals, and a long grain veneer ply is added to the accumulator gate system 118 (or 128) from the veneer insert station 119 (or 129) during the rotation of the carousel. The bottom doctor roller 1124 is applied to the bottom glue spreading roller 1122 at intervals, alternating between allowing gluing on both sides of a core ply and then only allowing gluing on the bottom side (with reference to the accumulator gate system 118 or 128).

Other final assemblies are also possible. For example, a quadruple 3 ply assembly is possible with pattern (g) on both carousels 114 and 124. With the addition of a conventional glue spray station 190 between second and third veneer stations 150 and 160 (shown by a dashed line in FIG. 14), at least an additional "balanced" six ply arrangement can be laid by selecting pattern (a) on both carousels 114 and 124.

Thus, the tandem system 2 provides an extremely wide range of possible products, and increases the throughput of the lay-up system. When the elements of the improved lay-up system 1 are combined in tandem, the output of the tandem system 2 for the previously described plywood assemblies is naturally doubled. Even a seven ply assembly may be laid in double. However, the speed and flexibility of the tandem system 2 yields additional benefits beyond what might be expected. In particular, as each carousel and accumulator gate system can be set to a different assembly pattern, the range of possible products is more than doubled. Furthermore, more complicated products may be made with the same output rate in completed ply assemblies at the bulk accumulator, requiring little or no change in processing, handling, or operator tasks.

Improving a Conventional Line

A third embodiment of the inventive lay-up system exists in applying at least the carousel and the accumulator gate system to an existing lay-up line of limited capability. As an example, FIG. 14 shows how an existing conveyor-type line 3 can be improved by the replacement of conventional core feeders (280, 290) of any kind with the elements of improved lay-up system.

As shown in FIG. 14, the conventional conveyor-type lay-up line lays each ply in line sequence along a conveyor 230. The lay-up line shown in FIG. 14 includes: (1) first veneer station 240, (2) first spreader 280, (3) second veneer station 250, (4) third veneer station 260, (5) second spreader 290, and (6) fourth veneer station 270 machines arranged in order along a conveyor 131. In this case, the veneer stations are conventional machines (for example, vacuum conveyors as depicted) able to supply one sheet at a time of long grain back, face, or center veneer to the conveyor 131. The spreaders 280, 290 are examples of conventional core applying machines, able to supply core fragments to be assembled on the conveyor. For example, the first spreader 280 includes a roller feeder 281 having feed and gluing rollers, used to glue slender random core fragments. The glued core fragments from the roller feeder 281, perpendicular to the main conveyor 131, are supplied to a secondary conveyor 282 parallel to and above the main conveyor 131. To align the glued core to the back sheet on the conveyer 131, a skilled manual alignment operation is needed. The secondary conveyor 282, running parallel to the main conveyor 131, drops the random core fragments onto the passing long grain plies or ply assemblies, and skilled operators arrange the random core on the conveyor 131 to cover each passing long grain ply completely. Firstly, an operator places the core fragments from the secondary conveyor next to each other on the passing ply or ply assembly. Then, a second operator aligns the plies in both X and Y directions to substantially cover the passing ply or ply assembly. While the feed rates of the roller feeder 281 and secondary conveyors 282 are synchronized with the speed of the ply assembly on the main conveyor 131, the timing of the two auxiliary supplies 281, 282 is not synchronizable relative to the position of each passing long grain ply. The roller feeder 281 and secondary conveyor 282 of the first spreader 280 are duplicated in the roller spreader 291 and secondary conveyor 292 of the second spreader 290, and function identically.

Other types of core feeder are known in the art in the spreader station position. The crossband cores may be arranged random core as described, or one-piece spliced core fed by a spreader as described. Adhesive may be applied by spray or curtain coat to one side of long grain plies or cores as they are laid, or may alternatively be applied by roller to both sides of a core ply as it is laid. Typically, each core ply is provided to a line or conveyor by an auxiliary line-type feeder, able to supply the main lay-up line at a rate synchronized with the lay-up line speed. Each ply, core or long grain, in the assembly order requires a dedicated feeder, and each feeder is necessarily placed along the lay-up line in the order that the ply appears in the final laminated sheet assembly.

Given that each conventional face or center feeding machine 240, 250, 260 and 260 and each conventional core feeding machine (spreaders 280 and 290) occupies a space adjacent to the conveyor 131 in a certain order, and that each machine has only alternatives of laying a ply or doing nothing, then a conventional conveyor-type lay-up line 3 as described has very little flexibility in product range. The line shown may only lay-up single 5-ply (machines 1, 2, 3, 4, and 6 ON); and double 3-ply (machines 1 through 6 ON) assemblies. If the roller feeders 291 is able to glue the core fragments selectively on either or both sides, then a single 4-ply (machines 1, 2, 5, and 6 ON) assembly may also be laid. Furthermore, if a random core feeder is used, the glued core must be manually aligned to each long grain ply on the conveyor 131 by skilled operators.

However, by replacing each conventional spreaders 280, 290 with a carousel 114, each with an accumulator gate system 119, and a veneer insert station 119 (in substantially the same space) the flexibility of the previously conventional line 3 may approach that of the previously described second embodiment of the invention. The output may also be doubled for standard products (3, 4 and 5 ply). Even a seven ply assembly, not possible with the described conventional line, may be laid in double as well as single. Furthermore, the addition of glue spreaders 112 (as described) removes the need for high-speed, high-maintenance curtain coaters. Spray systems, having limited reliability due to clogs and uneven gluing, may also be eliminated.

Even if the conveyor 131 is not controllable to adjust for various products as in the second embodiment, the added carousels 114, 114 and associated elements may be controlled to match the conveyor 131 speed, and the full range of previously described products may be produced. Thus, replacement of conventional core feeders 280, 290 with elements of the improved lay-up system 1 provides a significantly improved range of possible products, and increases the throughput of the conventional conveyor lay-up line 3. The output of the improved system 3 for three, four, and five ply products is at least doubled, and as each carousel and accumulator gate system can be set to a different assembly pattern, the range of possible products is also at least doubled. Furthermore, more complicated products may be made with the same output rate in completed ply assemblies at the bulk accumulator, requiring little or no change in processing, handling, or operator tasks. The general processing technique is retained.

Thus, the elements of the improved lay-up system 1 may be combined in an compact, efficient line as in improved system 1, combined in tandem to provide a wide range of products and doubled output for standard products as in the tandem system 2, or replace conventional elements of a conventional line to yield benefits in productivity and product range as in the improved conventional line 3.

What is claimed is:

1. A lay-up method for assembling plywood veneer plies, the lay-up method comprising the steps of:

(a) conveying a long grain back veneer ply to a conveyor toward a position beneath an accumulating means; then (b) gluing a unitary crossband core veneer ply; then (c) placing said glued unitary crossband core veneer ply in said accumulating means; then (d) holding said glued unitary crossband core veneer ply in said accumulating means while said long grain back veneer ply approaches; then (e) releasing plies held in said accumulating means on top of said long grain back veneer plies in synchronization with said approach of said long grain back veneer plies and aligned with said long grain back veneer plies to form a ply assembly.

2. The lay-up method according to claim 1, further comprising the step of:

(f) following step (e), providing a long grain face veneer ply on top of said ply assembly in synchronization with an approach of said ply assembly and aligned with said ply assembly.

3. The lay-up method according to claim 1, further comprising the steps of:

(c') following step (c) and preceding step (d), providing a long grain center veneer ply to said accumulating means on top of said glued unitary crossband core veneer ply; then (d') following step (d) and preceding step (e), repeating steps (b), (c), and (c') according to a predetermined lay-up pattern.

4. The lay-up method according to claim 3, further comprising the step of:

(f) following step (e), providing a long grain face veneer ply on top of said ply assembly in synchronization with an approach of said ply assembly and aligned with said ply assembly.

* * * * *